United States Patent

Nanba et al.

[11] Patent Number: 5,844,713
[45] Date of Patent: Dec. 1, 1998

[54] IMAGE DISPLAYING APPARATUS

[75] Inventors: Norihiro Nanba, Kawasaki; Tsunefumi Tanaka, Yokohama; Hideki Morishima, Kawasaki; Takeshi Akiyama, Yokohama, all of Japan

[73] Assignee: Canon Kabushiki Kaisha, Tokyo, Japan

[21] Appl. No.: 607,092

[22] Filed: Feb. 28, 1996

[30] Foreign Application Priority Data

Mar. 1, 1995 [JP] Japan .................................. 7-066951

[51] Int. Cl.⁶ .......................... G02B 17/00; G02B 21/00; G02B 27/10
[52] U.S. Cl. ............................................. 359/364; 359/618
[58] Field of Search ...................... 359/364, 365, 359/366, 471, 472, 630, 631, 633, 636, 618

[56] References Cited

U.S. PATENT DOCUMENTS

| | | | |
|---|---|---|---|
| 3,659,920 | 5/1972 | McGlasson | 359/631 |
| 3,936,605 | 2/1976 | Upton | 179/1 |
| 4,714,320 | 12/1987 | Banbury | 359/364 |
| 5,161,480 | 11/1992 | Furuya et al. | 116/62.1 |
| 5,334,991 | 8/1994 | Wells et al. | 345/8 |
| 5,384,654 | 1/1995 | Iba | 359/364 |
| 5,530,586 | 6/1996 | Yasugaki | 359/364 |
| 5,546,227 | 8/1996 | Yasugaki et al. | 359/630 |

*Primary Examiner*—Jon W. Henry
*Assistant Examiner*—Mark A. Robinson
*Attorney, Agent, or Firm*—Morgan & Finnegan, L.L.P.

[57] ABSTRACT

This invention velates to an image displaying apparatus which includes a plurality of image displaying devices for displaying respective display images on display surfaces thereof, reflecting surfaces provided in correspondence to the respective image display devices, each for reflecting a light beam from the corresponding image display device and an optical system for guiding light beams from the plurality of reflecting surfaces to a pupil of an observer.

12 Claims, 15 Drawing Sheets

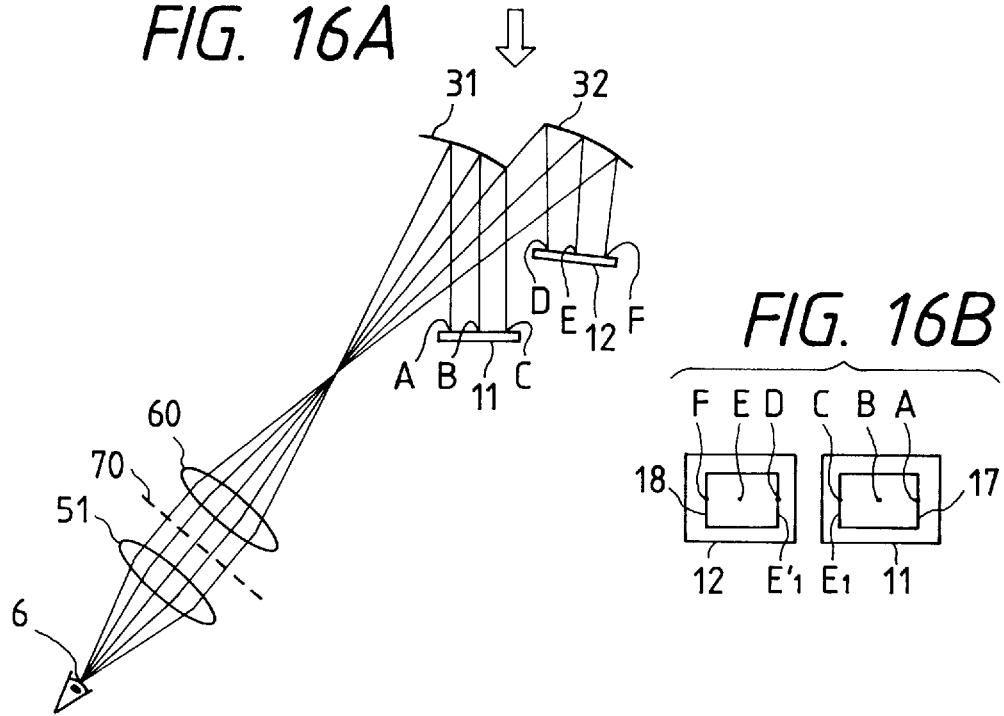
FIG. 16A
FIG. 16B
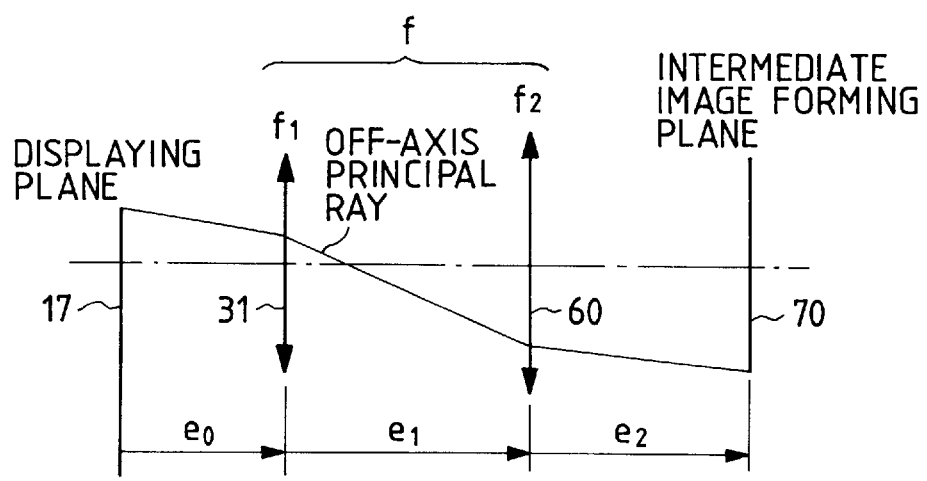
FIG. 17

PRIOR ART

IMAGE DISPLAYING APPARATUS

BACKGROUND OF THE INVENTION

1. Field of the Invention

The present invention relates to an image displaying apparatus, and more particularly, to the image displaying apparatus which is disposed near the eye part of an observer and which is suitable for displaying a large-size and high-definition virtual image in observing an enlarged virtual image of an image displayed on an image display means.

2. Related Background Art

The conventionally known image displaying apparatus to be set near the eye part of the observer include a helmet mounted display integrally formed with a helmet and a head mounted display a support member of which is mounted on the head and which is more compact and lighter than the helmet mounted display. These are arranged to enlarge an image displayed on the image display device such as a CRT or an LCD and to display an enlarged virtual image thereof ahead of the observer through an observing optical system.

In the case of such image displaying apparatus, the observer does not directly observe an image displayed on a stationary monitor or a large screen or the like, but observes a large virtual image converted into from an image displayed on a compact image display means by an optical system. Thus, they have such a feature that the entire apparatus can be formed in a compact arrangement and the apparatus can supply a larger image than the size of the image on a display surface of the image displaying apparatus to the observer.

FIG. 28 shows a setup of such a conventional image displaying apparatus. In the drawing, reference numeral 111 denotes an image display means, 112 an observing optical system, 6 an eye point where the observer's pupil is located, and 113 a virtual image observed by the observer. The observer observes the enlarged virtual image 113 of the image displayed on the image display means 111 from the eye point 6 through the observing optical system 112.

In order to provide the observer with a wide-field-angle and high-definition image by such displaying apparatus, the display image on the image display means 111 must be a high-definition image. For that purpose, it is effective to use a high-definition image display means or to use a plurality of normal image display means to observe a large synthetic image synthesized from images displayed on the image display means.

Research paper "Studies on wide-visual-field visual system for tele-existence" (Research Papers, THE JAPAN SOCIETY OF MECHANICAL ENGINEERS, Vol. 59, No. 564 (1993), p 224) discloses the optical system arranged in such a manner that, as shown in FIG. 29, two image display means 114, 115 are disposed for one eye of observer, a plane mirror 118 is set between one image display means 114 out of two and an eyepiece lens 120, an image on the image display means 114 is reflected by the plane mirror 118 as being combined with an image on the image display means 115, and the two images each with an apparent field angle θ are combined with each other to obtain a synthetic image with an apparent field angle 2θ.

If the virtual image is enlarged by increasing the magnification of the observing optical system 112 in the first conventional example as described above, pixels constituting the virtual image also become larger as the magnification becomes greater, resulting in observing a low-definition virtual image. This would be a problem particularly in the case of use of a compact liquid crystal panel having lower resolving power (definition) than the CRT. This can be solved by using a compact, high-density and multi-pixel liquid crystal panel, i.e., a so-called TFT type liquid crystal panel. However, an increase of the number of pixels also increases a rate of an occupying area of a light-shielding portion covering the TFT, wiring, etc. associated with each pixel, thus raising a problem of a decrease of an aperture rate of the whole panel. There is also a limit to increasing the density of pixels in respect of fabrication.

If the number of pixels is increased by increasing the display area of image, the outer diameter of the observing optical system 112 becomes greater as the size of the image display means 111 increases, thus resulting in a problem of an increase of the whole apparatus.

In the case of the CRT being used, it is also naturally impossible to obtain a higher-resolution image than the resolving power defined by the number of scanning lines or the like. Thus, for example even though higher-definition computer graphics (CG) than the resolving power are produced, there is a problem that high-definition CG expected cannot be attained because of limitations imposed by the performance of CRT.

According to the second conventional example, the images by the plural image display means are combined by devising a spatial layout, and a high-definition image can be obtained in the compact arrangement. However, because the optical system in the above report "Studies on wide-visual-field visual system for tele-existence" is arranged so that the observing optical system associated with one image display means 115 out of the two image display means has no reflecting surface between the image display surface and the eyepiece lens, the image display means is located as projecting forward of the observer. When the observer wears the image displaying apparatus of such arrangement, a weighty feeling increases because of great mechanical moment exerted on the wearing portion, which raises a problem of making the observer tired after continuous wearing.

If a wide-angle observing apparatus is employed, the principal point separation between the image display surface and the lens becomes shorter because the focal length of the eyepiece lens 120 becomes shorter. However, since the optical system in the above report has the plane mirror 118 disposed in the optical path between the image display surface and the eyepiece lens 120, the wide-angle arrangement will cause the problem that it becomes difficult to spatially position the plane mirror.

Further, in the case of the arrangement in the above report, only the display image on the image display means 114 needs to be displayed as a mirror image inverted left to right. From the viewpoint of portability a circuit for inversion of image is preferably built in the image display means 114. In that case, it is necessary to prepare the image display means 114 having the image inversion circuit and the image display means having no image inversion circuit, which increases the number of parts constituting the apparatus, thus becoming disadvantageous in respect of the cost and assembling of apparatus.

SUMMARY OF THE INVENTION

An object of the present invention is to provide an image displaying apparatus to be disposed near the eye part of observer, as arranged to observe an enlarged virtual image of display images displayed on image display means, which is arranged to connect the display images displayed on the plural image display means to synthesize an image in the observing optical system, thereby attaining an image with a wider view angle or an image with a normal view angle but of higher definition than by the conventional apparatus.

An embodiment of the image displaying apparatus of the present invention for achieving this object is characterized by comprising:

a plurality of image displaying means for displaying respective display images on display surfaces thereof;

reflecting surfaces provided in correspondence to the respective image display means, each for reflecting a light beam from the corresponding image displaying means; and an optical system for guiding light beams from the plurality of reflecting surfaces to a pupil of an observer.

In a preferred embodiment, the plurality of reflecting surfaces are positioned so that adjacent-side principal rays of adjacent display images in adjacent display images out of the plurality of display images may come to substantially coincident with each other after reflected by the plurality of reflecting surfaces.

In a preferred embodiment, the optical system has an anamorphic optical system.

In a preferred embodiment, the plurality of reflecting surfaces each are of a paraboloid of revolution and the reflecting surfaces are positioned so that focus positions of the respective reflecting surfaces may substantially coincide with each other.

In a preferred embodiment of the image displaying apparatus, an optical pathlength from the display surface to the reflecting surface corresponding thereto, of a principal ray emerging from the center of the display surface of the image display means differs depending upon each image displaying means.

In a preferred embodiment, at least two reflecting surfaces out of the plurality of reflecting surfaces are formed in an integral member.

In a preferred embodiment, the image displaying means are reflection type display panels having reflecting surfaces in pixel units.

Another embodiment of the image displaying apparatus of the present invention is characterized by comprising:

a plurality of image displaying means for displaying respective display images on display surfaces thereof; and an optical system having a plurality of curved reflecting surfaces provided in correspondence to the respective image display means, each curved reflecting surface for reflecting a light beam from the corresponding image displaying means to guide the light beam to a pupil of an observer.

In a preferred embodiment, the plurality of curved reflecting surfaces are positioned so that adjacent-side principal rays of adjacent display images in adjacent display images out of the plurality of display images may come to substantially coincident with each other after reflected by the plurality of curved reflecting surfaces.

In a preferred embodiment, the plurality of reflecting surfaces each are of a paraboloid of revolution and the reflecting surfaces are positioned so that focus positions of the respective reflecting surfaces may substantially coincident with each other.

In a preferred embodiment of the image displaying apparatus, an optical pathlength from the display surface to the reflecting surface corresponding thereto, of a principal ray emerging from the center of the display surface of the image display means differs depending upon each image displaying means.

In a preferred embodiment, at least two reflecting surfaces out of the plurality of reflecting surfaces are formed in an integral member.

In a preferred embodiment, the image displaying means are reflection type display panels having reflecting surfaces in pixel units.

Another embodiment of the image displaying apparatus of the present invention is characterized by comprising:

a plurality of image displaying means for displaying respective display images on display surfaces thereof;

a relay optical system for forming intermediate images of the respective display images in an adjacent fashion, the relay optical system having optical systems provided in correspondence to the respective image displaying means;

reflecting surfaces provided in correspondence to the respective intermediate images, for reflecting the intermediate images so that adjacent-side principal rays of adjacent intermediate images out of the intermediate images may come to substantially coincide with each other; and an observing optical system for guiding light beams from the reflecting surfaces to a pupil of an observer, thereby letting the observer observe an enlarged virtual image of the intermediate images.

In a preferred embodiment, the reflecting surfaces each are formed of respective curved surfaces.

In a preferred embodiment, the observing optical system has an anamorphic optical system.

In a preferred embodiment, the reflecting surfaces are formed in an integral member in an adjacent fashion.

In a preferred embodiment, the reflecting surfaces have a diffusing action.

In a preferred embodiment, the image displaying means are reflection type display panels having reflecting surfaces in pixel units.

BRIEF DESCRIPTION OF THE DRAWINGS

FIGS. 16A and 16B are schematic drawings of the major part of Embodiment 9 of the present invention;

FIG. 17 is an explanatory drawing to illustrate paraxial relations between elements in a two-group relay optical system;

DESCRIPTION OF THE PREFERRED EMBODIMENTS

Figure 1A:
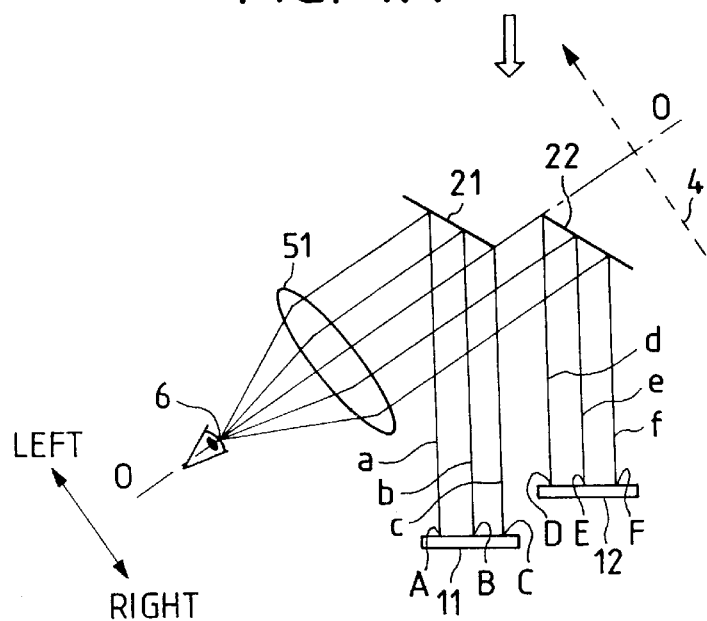
FIGS. 1A and 1B are schematic drawings of the major part of Embodiment 1 of the present invention.
Figure 1B:
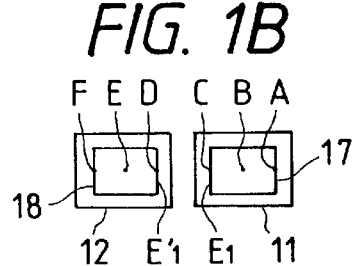

FIGS. 1A and 1B are schematic drawings to show the major part of Embodiment 1 of the present invention. FIG. 1A is a plan view of the major part. FIG. 1B is a view of image displaying means 11 and 12 when observed along the direction of the arrow in FIG. 1A. In the drawings, numerals 11, 12 designate the image displaying means, which are comprised of liquid crystal panels or the like. The image displaying means 11, 12 have respective display surfaces 17 and 18 for displaying respective images thereon. (In the following description, the display surfaces of the image displaying means will be called simply as "display surfaces" and the images displayed on the display surfaces as "display images.") Numerals 21, 22 denote flat reflecting surfaces, 51 an eyepiece lens (eyepiece optical system), and 6 an eye point where the observer's pupil is located.

Further, a, b, c represent principal rays of beams emerging from points A, B, C on the display surface 17 of the image displaying means 11 (where B is at the center of the display surface and A, C are at the centers of the side edges of the rectangular display surface), and d, e, f principal rays of beams emerging from points D, E, F on the display surface 18 of the image displaying means 12 (where E is at the center of the display surface and D, F are at the centers of the side edges of the rectangular display surface). The "principal ray" stated herein means a ray emerging from each point on the display surface and reaching the center of the pupil located at a predetermined position. (The same definitions of a–f, A–F and of principal rays are also applied to the following embodiments.)

The flat reflecting surface 21 reflects only beams emerging from the image displaying means 11 to guide the beams through the eyepiece lens 51 to the eye point 6. In this arrangement the flat reflecting surfaces 21, 22 are arranged as inclined relative to the optical axis O of the eyepiece 51, and the flat reflecting surface 21 is positioned so as not to interrupt any principal rays of an effective beam from the flat reflecting surface 22. The effective beam mentioned herein means a beam emerging from a display image region necessary for forming a synthetic image, which is a beam expected to be incident to the observer's pupil. Further, the flat reflecting surfaces 21 and 22 are positioned so that principal rays from the edges $E_1$, $E_1'$ passing the predetermined points (C and D) on the respective image displaying means 11, 12 may coincide with each other after reflected by the flat reflecting surfaces 21, 22 (or so that the principal rays c, d etc. in FIG. 1A may coincide with each other after reflected by the respective flat reflecting surfaces 21 and 22).

Each of the flat reflecting surfaces 21, 22 and eyepiece 51 is an element of the observing optical system. Accordingly, the observing optical system associated with the image displaying means 11, 12 is formed to share the eyepiece 51 on the eye point side of the reflecting surfaces 21, 22.

In the present embodiment, because an optical pathlength from the flat reflecting surface 21 to the eyepiece 51 is different from that from the flat reflecting surface 22 to the eyepiece 51, optical pathlengths between the display surfaces and the flat reflecting surfaces 21, 22, of the principal rays outgoing from the centers of the display surfaces of the image displaying means 11, 12 are set as different from each other so as to equalize the optical pathlengths from the image displaying means 11, 12 to the eyepiece 51.

The above arrangement permits the beams emerging from the image displaying means 11, 12 to be coupled with each other in the optical paths after the reflecting surfaces 21, 22, thereby forming an integral beam. Thus, the observer will observe a virtual image 4 as a synthetic image obtained by connecting the two display images of the two image displaying means 11, 12 with each other.

Since the flat reflecting surfaces 21, 22 have a function to synthesize one image from a plurality of display images, such reflecting surfaces will be called hereinafter as "synthesizer reflecting surfaces".

The observing optical system has a same number of (one in Embodiment 1) reflecting surface 21, 22 per image displaying means for reflecting only the beam from the each display image toward the pupil in correspondence to the each image displaying means 11, 12, and the optical system (the eyepiece 51 in Embodiment 1) disposed between the synthesizer reflecting surfaces 21, 22 nearest to the observer's pupil in correspondence to the respective image displaying means and the observer's pupil is a common optical system to the beams from the plural display images.

In the present embodiment the beams from point C and point D lose some light quantity because of vignetting of at most the half thereof at the flat reflecting surfaces 21, 22, but no trouble occurs if NA is set sufficiently large on the side of the image displaying means 11, 12 in the portions related to the respective display images in the observing optical system.

Since the present embodiment employs the flat reflecting surfaces 21, 22, the display images displayed on the respective displaying means 11, 12 must be mirror images inverted left to right or inverted top to bottom depending upon the location of the optical system relative to the observer's head. In the case of left-to-right inversion, an example may be such that image signals are produced as mirror-inverted in field units, using a memory having a capacity of one field of image, and the image signals are divided into new image signals in correspondence to the number of the image displaying means. In the case of top-to-bottom inversion, an example may be such that a new image signal is produced as inverted top to bottom in a screen unit, using a memory for one image field.

Figure 2A:
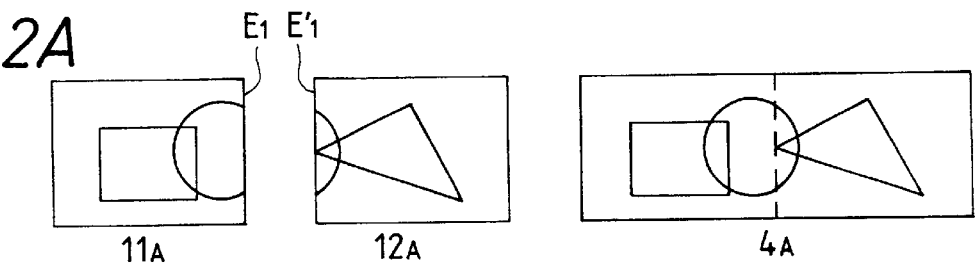
FIGS. 2A and 2B are explanatory drawings to illustrate display images and virtual images synthesized therefrom in Embodiment 1.
Figure 2B:
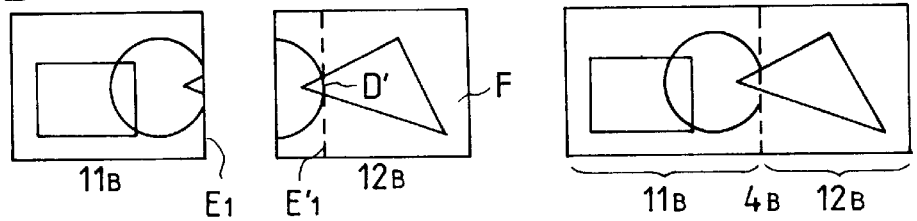

FIGS. 2A and 2B are explanatory drawings to illustrate display images and virtual images synthesized therefrom in Embodiment 1.

This is next explained. In FIG. 2A $11_A$, $12_A$ are the display images displayed on the respective image displaying means 11, 12, showing two segments of a continuous image. Further, $4_A$ is a synthetic virtual image, which is synthesized so that the edges $E_1$, $E_1'$ of the images $11_A$, $12_A$ may coincide with each other.

For example, if the display images $11_A$, $12_A$ in the aspect ratio of 3:4 are combined through the observing optical system, the synthetic virtual image $4_A$ becomes an image in the wide aspect ratio of 3:8.

Embodiment 1 achieves the image displaying apparatus arranged to connect the display images on the plural image displaying means to synthesize an image, thereby attaining image quality of high definition even when the virtual image is enlarged by the wide-angle eyepiece optical system, and including no mixture of normal image and mirror image between the plural display images.

Further, the flat reflecting surfaces 21, 22 are positioned so that the principal rays from the edge $E_1$ passing point C and the principal rays from the edge $E_1'$ passing point D in the two display images may coincide with each other after reflected by the respective flat reflecting surfaces 21, 22. In this manner the synthesizer reflecting surfaces are positioned so that some of the principal rays of the beam reflected by the synthesizer reflecting surface 21 corresponding to the image displaying means 11 may come to substantially coincide with some of the principal rays of the beam reflected by the synthesizer reflecting surface 22 corresponding to the image displaying means 12. This realizes a good connection state between the two images combined, thus achieving the image quality of high definition.

Further, the present embodiment is arranged to perform image synthesization by the first surfaces of the observing optical system and to employ the common optical system for the second surface and thereafter, thus decreasing the number of parts so as to realize the low cost.

Further, the present embodiment uses the image displaying means in the same size, thereby achieving the image displaying apparatus with the image quality of high definition and at low cost.

Since the beams from the image displaying means 11, 12 all are reflected by the flat reflecting surfaces 21, 22, the image displaying means 11, 12 may be positioned along the observer's head. Thus, the image displaying apparatus can be formed in the arrangement not projecting forward from the observer's head, so that the displaying apparatus may give a good feeling of fitting in a good weight balance and with little making the observer tired.

In the present embodiment the flat reflecting surfaces 21, 22 are preferably formed in an integral structure. Namely, if the positions and angles of the flat reflecting surfaces 21, 22 should deviate from predetermined values, the connecting portion of the synthetic image would become discontinuous, resulting in failing to observe a good image. Thus, if the flat reflecting surfaces 21, 22 are integrally formed, there is no need to form a member for adjusting relative positional deviation and angular deviation of these flat reflecting surfaces, thus permitting compactification and cost reduction of the entire apparatus. The flat reflecting surfaces 21, 22 may be integrally formed for example by integrally molding them of a synthetic resin or the like and depositing a metal on the reflecting surface portions by vapor deposition of the metal or the like. Occurrence of flare and ghost can be suppressed by keeping the reflectivity of the portions other than the reflecting surfaces low by applying a flat coating or the like thereto on that occasion.

The image displaying means 11, 12 are CRTs, transmission type liquid crystal panels, reflection type liquid crystal panels, or reflection type display devices in which a lot of micro-mirrors are arranged in a grid pattern in an angle-controllable arrangement in units of micro-mirrors.

When the reflection type liquid crystal panels or the reflection type display devices are used among these image displaying means, an illumination optical system is necessary in addition. Illumination light may be guided obliquely to the display surfaces of the image displaying means 11, 12 or normally to the display surfaces through a half mirror or the like disposed between the image displaying means 11, 12 and the observing optical system.

FIG. 2B is an explanatory drawing to illustrate a case where the display images $11_B$, $12_B$ are combined so that a part of the flat reflecting surface 22 of Embodiment 1 (a portion for reflecting the point D side of the display surface 18) is arranged to overlap with the flat reflecting surface 21 behind it.

The display images $11_B$, $12_B$ indicate respective regions greater than 50% taken out of one continuous image. They can be combined with each other in such a manner that principal rays from the portion to become continuous to the display image $11_B$ ($E_1'$ in the display image $12_B$) after reflected by the flat reflecting surface 22 may come to coincide with principal rays from the edge $E_1$ of the display image $11_B$ after reflected by the flat reflecting surface 21. This gives one continuous virtual image $4_B$ from the two display images $11_B$, $12_B$.

This arrangement facilitates positioning by controlling the display states when deviation of image synthesization occurs due to production and assembling errors of the optical system or the like. For example, when the liquid crystal panels are used as the image displaying means 11, 12, the display positions of images may be adjusted in the pixel level of liquid crystal. If the CRTs are used, scanning start positions thereof may be adjusted.

The eyepiece 51 in Embodiment 1 was the rotationally symmetric optical system, but it may be replaced by an anamorphic optical system having different vertical and horizontal image magnifications.

Figure 3A:
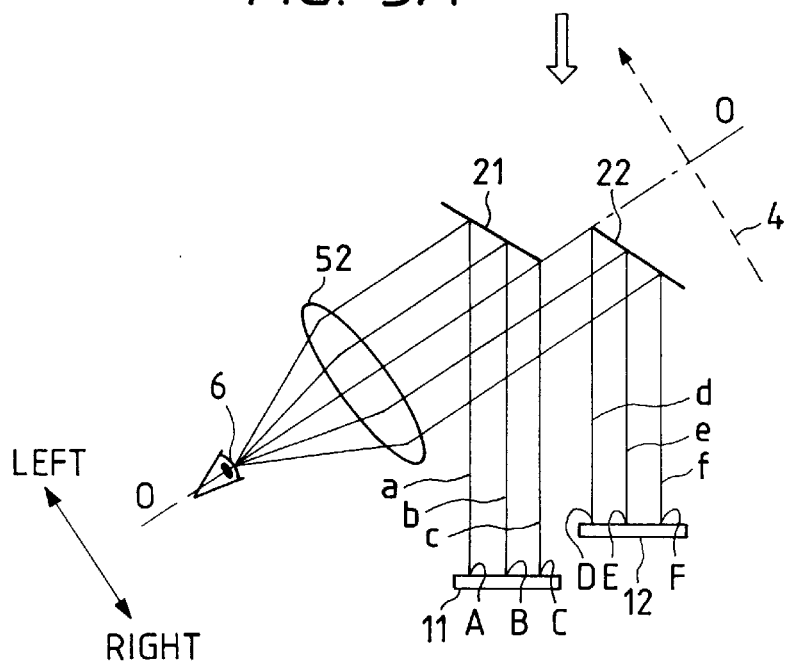
FIGS. 3A and 3B are schematic drawings of the major part of Embodiment 2 of the present invention.
Figure 3B:
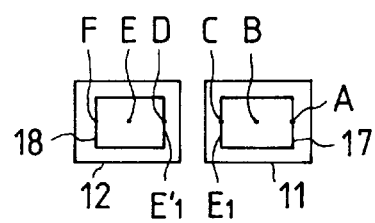

FIGS. 3A and 3B are schematic drawings to show the major part of Embodiment 2 of the present invention. The present embodiment employs the anamorphic optical system for the observing optical system of Embodiment 1. Namely, the eyepiece 52 of the present embodiment is the anamorphic optical system having different vertical and horizontal curvatures. The eyepiece 52 thus has the vertical image magnification greater than the horizontal image magnification.

Figure 4A:
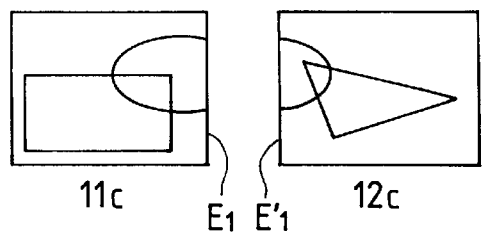
FIGS. 4A and 4B are explanatory drawings to illustrate display images and a virtual image synthesized therefrom in Embodiment 2.
Figure 4B:
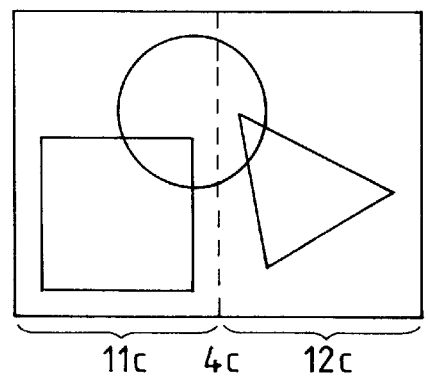

FIGS. 4A and 4B are explanatory drawings to illustrate display images and a virtual image in Embodiment 2. In the drawings, $11_C$, $12_C$ are the display images obtained by dividing a continuous input image into two images and compressing the respective images at a predetermined ratio in the vertical direction, and $4_C$ is the virtual image obtained by changing the aspect ratio of the display images through the anamorphic eyepiece 52 in the present embodiment and combining the images.

For example, if the eyepiece 52 used has the vertical image magnification double the horizontal image magnification, the two display images at the aspect ratio of 3:4 yield a synthetic image at the same aspect ratio of 3:4.

The present embodiment provides the image displaying apparatus arranged in such a manner that, in combining a plurality of display images obtained by dividing an input image into images and compressing or expanding, the images into one virtual image, the display images are combined at the different vertical and horizontal magnifications, thus providing a high-definition virtual image synthesized at the aspect ratio of the input image.

The other effects are the same as in Embodiment 1.

Figure 5A:
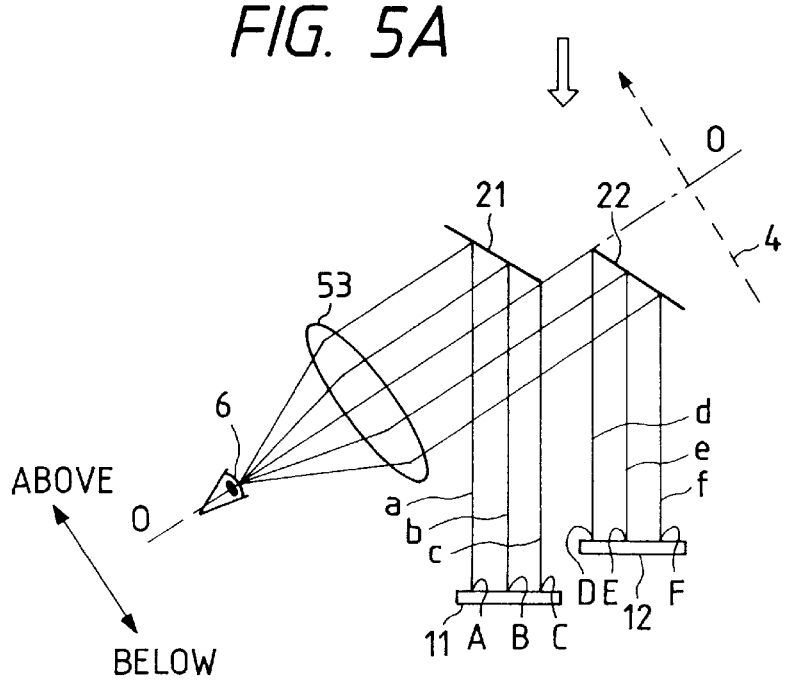
FIGS. 5A and 5B are schematic drawings of the major part of Embodiment 3 of the present invention.
Figure 5B:
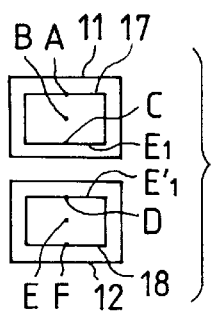

FIGS. 5A and 5B are schematic drawings to show the major part of Embodiment 3 of the present invention. The present embodiment is an embodiment using an anamorphic optical system for expanding the image field in the horizontal direction as the observing optical system for combining two upper and lower display images. The eyepiece 53 is an anamorphic eyepiece lens having a horizontal image magnification greater than a vertical image magnification.

Figure 6A:
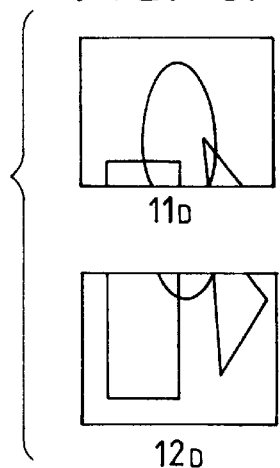
FIGS. 6A and 6B are explanatory drawings to illustrate display images and a virtual image synthesized therefrom in Embodiment 3.
Figure 6B:
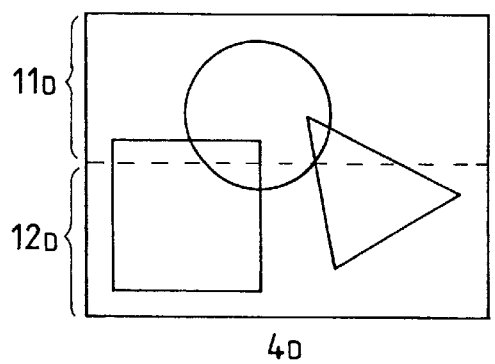

FIGS. 6A and 6B are explanatory drawings to illustrate display images and a virtual image synthesized therefrom in Embodiment 3. In the drawings, $11_D$, $12_D$ are the display images obtained by dividing a continuous image into upper and lower images and compressing the respective images at a predetermined ratio in the horizontal direction, and $4_D$ is the virtual image obtained by changing the aspect ratio of the display images through the anamorphic eyepiece 53 of the present embodiment and combining the display images with each other.

For example, if the eyepiece 53 used is one having the horizontal image magnification double the vertical image magnification, two display images at the aspect ratio of 3:4 yield a synthetic image at the same aspect ratio of 3:4.

The effect of the present embodiment is the same as Embodiment 2.

Figure 7:
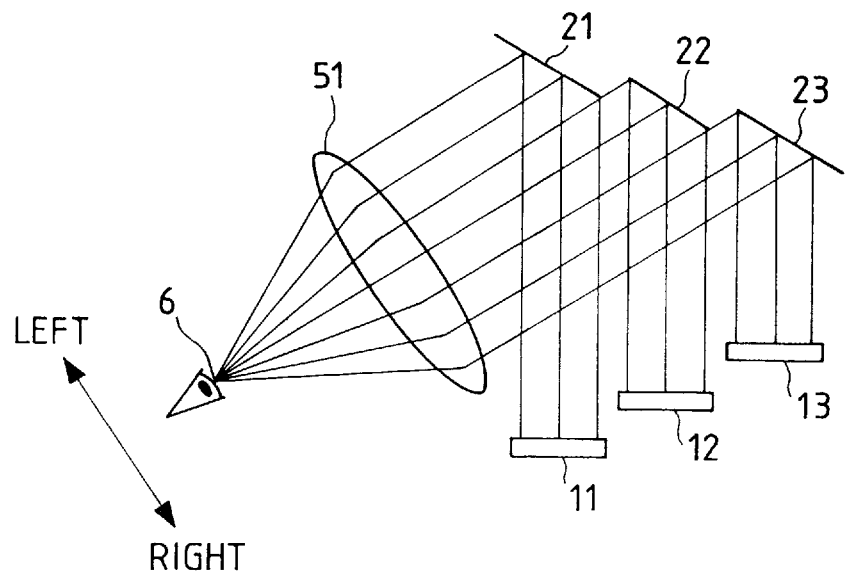
FIG. 7 is a schematic drawing of the major part of Embodiment 4 of the present invention.

FIG. 7 is a schematic drawing to show the major part of Embodiment 4 of the present invention. The present embodiment has a layout similar to Embodiment 1, and is an embodiment arranged in such a manner that images displayed on three image displaying means 11, 12, and 13 are serially combined by three plane reflecting surfaces (synthesizer reflecting surfaces) 21, 22, 23.

This arrangement permits the observer to observe a plurality of display images set on a line as a horizontally elongate wide-aspect-ratio synthetic image. A further higher-definition image displaying apparatus can be obtained by using three or more image displaying means as described.

In the present embodiment each of the flat reflecting surfaces (synthesizer reflecting surfaces) 21, 22, 23 and eyepiece 51 is an element of the observing optical system.

Figure 8:
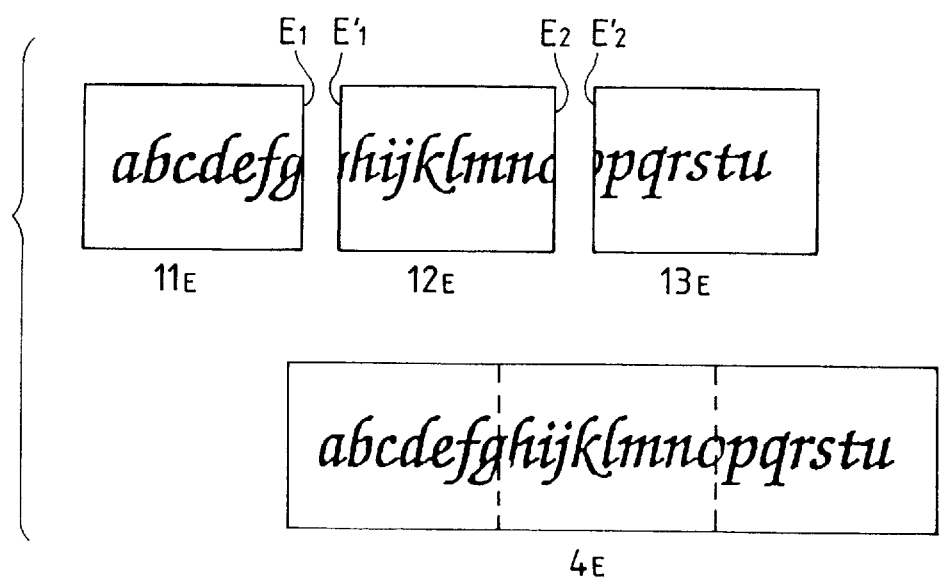
FIG. 8 are an explanatory drawing to illustrate display images and a virtual image synthesized therefrom in Embodiment 4.

FIG. 8 is an explanatory drawing to illustrate display images and a virtual image synthesized therefrom in Embodiment 4. In the drawing, $11_E$, $12_E$, $13_E$ are the display images on the respective image displaying means 11, 12, 13, and $4_E$ is the virtual image synthesized in the present embodiment, in which the image is synthesized so that adjacent edges $E_1$ and $E_1'$ and adjacent edges $E_2$ and $E_2'$ of the respective images may coincide with each other.

The effect of the present embodiment is the same as that of Embodiment 1, but the field angle becomes further greater than that of Embodiment 1.

Figure 9B:
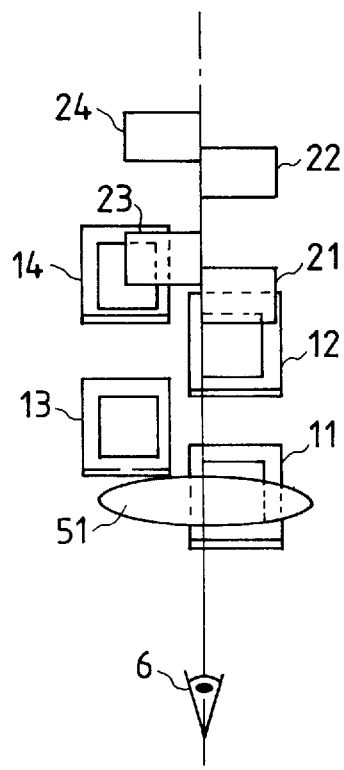
FIGS. 9A, 9B, and 9C are schematic drawings of the major part of Embodiment 5 of the present invention.
Figure 9A:
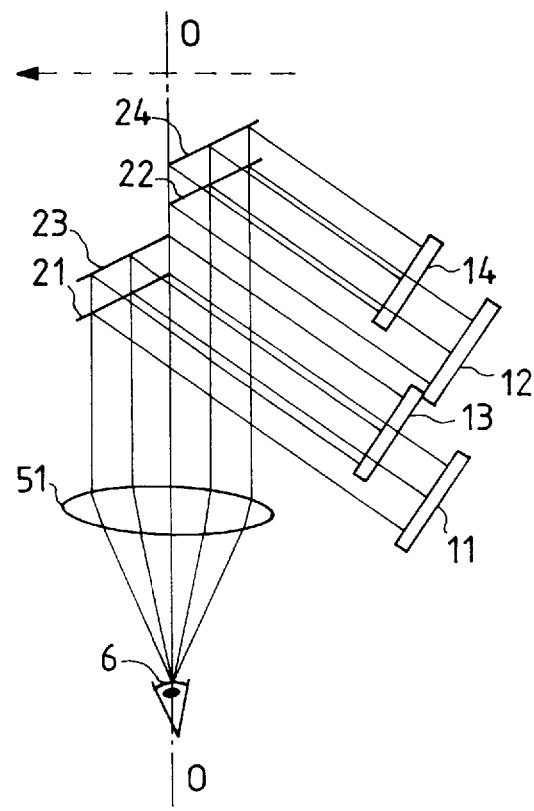
Figure 9C:
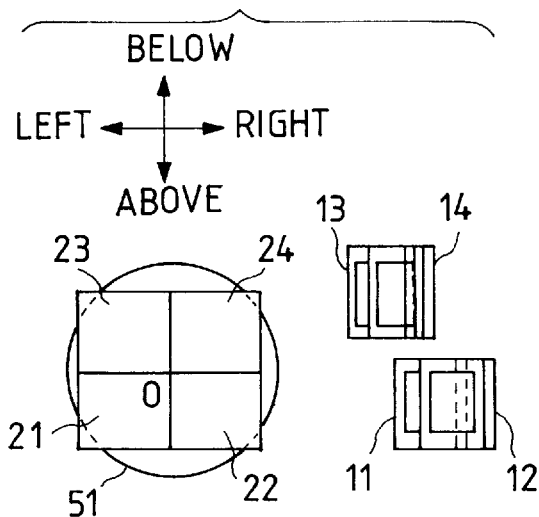

FIGS. 9A, 9B, and 9C are schematic drawings to show the major part of Embodiment 5 of the present invention. The present embodiment is an embodiment for combining four display images into one image. FIG. 9A is a plan view, FIG. 9B a side view, and FIG. 9C a back view. In the drawings, 11, 12, 13, 14 denote the image displaying means. Further, 21, 22, 23, 24 designate flat reflecting surfaces, which are synthesizer reflecting surfaces for reflecting light beams from the respective image displaying means 11–14 and combining these light beams into one light beam. The flat reflecting surfaces 21–24 are positioned so that the four reflecting surfaces may be arranged without a clearance when observed along the optical-axis direction of the eyepiece 51, as shown in FIG. 9C.

Each of the flat reflecting surfaces (synthesizer reflecting surfaces) 21 to 24 and eyepiece 51 is an element of the observing optical system. The observing optical system has a same number of (one in the present embodiment) reflecting surface per image displaying means for reflecting only the light beam from the display image in correspondence to each image displaying means towards the pupil, and the optical system (the eyepiece 51 in the present embodiment) existing between the observer's pupil and the reflecting surface closest to the observer's pupil, corresponding to the each image displaying means (either one of the flat reflecting surfaces 21, 22, 23, 24 in the present embodiment), is a common optical system to the light beams from the four display images.

Figure 10A:
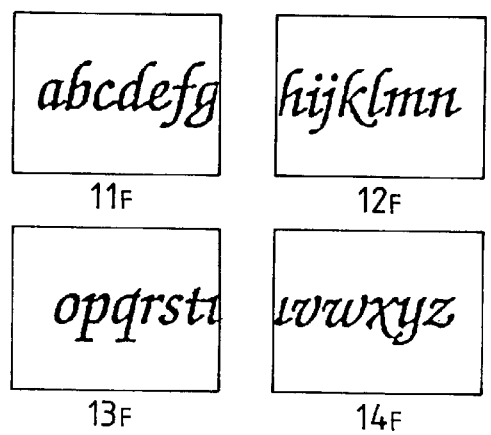
FIGS. 10A and 10B are explanatory drawings to illustrate display images and a virtual image synthesized therefrom in Embodiment 5.
Figure 10B:
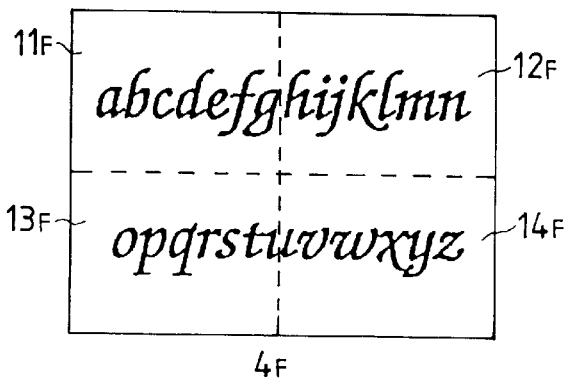

FIGS. 10A and 10B are explanatory drawings to show display images and a virtual image synthesized therefrom in Embodiment 5. In the drawings, $11_F$, $12_F$, $13_F$, $14_F$ are the display images on the respective image displaying means, and $4_F$ is the virtual image synthesized therefrom by the present embodiment, in which the image is synthesized so that adjacent edges of the display images may coincide with each other.

This arrangement permits a high-definition virtual image to be obtained at the unchanged aspect ratio by dividing one image into a quartered square shape and combining them as displaying each image on one image displaying means.

Figure 11A:
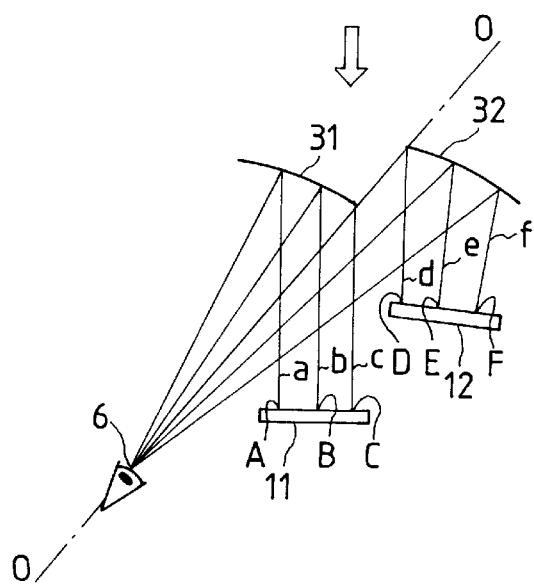
FIGS. 11A, and 11B are schematic drawings of the major part of Embodiment 6 of the present invention.
Figure 11B:
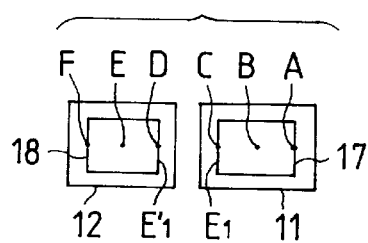

FIGS. 11A and 11B are schematic drawings to illustrate the major part of Embodiment 6 of the present invention. The present embodiment is different from Embodiment 1 in that the synthesizer reflecting surfaces used for image synthesization are shaped each in a curved surface and the curved reflecting surfaces have a function as an eyepiece optical system.

In the drawings, numerals 31, 32 represent the reflecting surfaces having respective curvatures arranged as decentered from the optical axis (the axis connecting the center of the observer's pupil with the center of the virtual image), each of which has a function as an eyepiece optical system for guiding a light beam emerging from the associated image displaying means 11, 12 to the eye point 6 to form an enlarged virtual image. Further, each of the curved reflecting surfaces (synthesizer reflecting surfaces) 31, 32 is an element of the observing optical system.

The curved reflecting surfaces 31, 32 are positioned in the same conditions as the flat reflecting surfaces 21, 22 of Embodiment 1 are positioned. Namely, the curved reflecting surface 31 is positioned so as not to interrupt any principal rays of an effective beam from the curved reflecting surface 32 and so that the principal rays (c and d etc.) from the edges $E_1$, $E_1'$ passing the predetermined points (C and D) on the respective image displaying means 11, 12 may coincide with each other after reflected by the respective curved reflecting surfaces 31, 32.

Since the present embodiment uses no lens in the eyepiece optical systems, a very compact and light image displaying apparatus can be obtained even if arranged as a wide-angle image displaying apparatus. Further, because the distances between the display surfaces and the eyepiece optical systems (curved reflecting surfaces) are shorter than those in the arrangement of Embodiment 1, the focal length of the each eyepiece optical system can be shortened, which is suitable for the wide-angle image displaying apparatus.

In the present embodiment the positions and sizes of virtual images are preferably coincident with each other in the two eyepiece optical systems constituted by the curved reflecting surfaces 31, 32. When the display sizes of the image displaying means 11, 12 are equal to each other as shown in FIG. 11B, a need is to make diopters and magnifications associated with the reflecting surfaces 31, 32 coincident with each other. In this case, since the optical path-lengths from the eye point 6 to the curved reflecting surfaces 31, 32 are different from each other, the curved reflecting surfaces 31, 32 need to have mutually different refractive powers and element locations.

A method for determining them is next explained.

Figure 12:
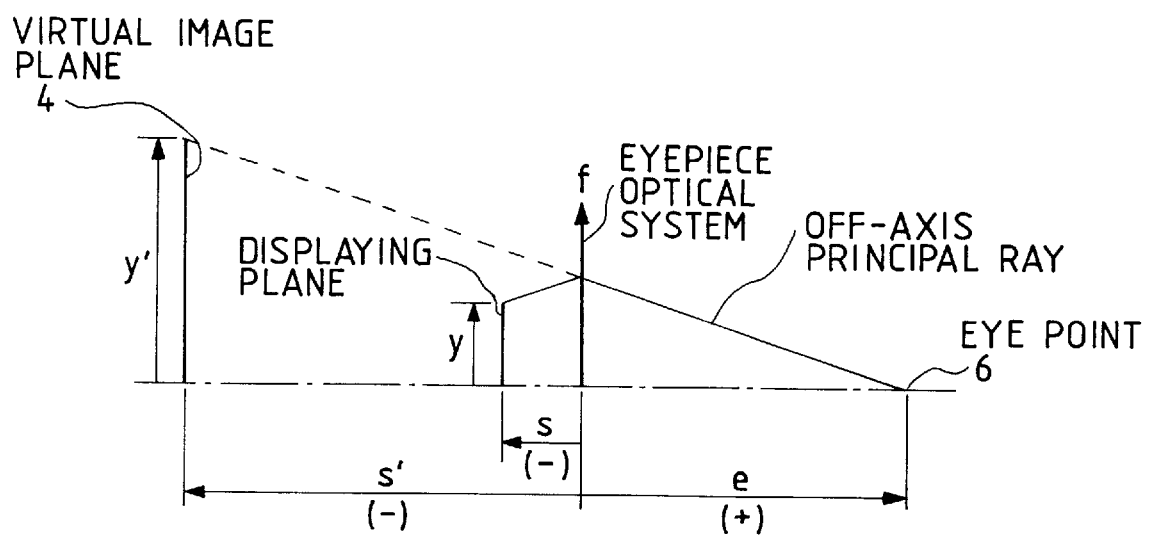
FIG. 12 is an explanatory drawing to illustrate paraxial relations between elements in an eyepiece optical system.

FIG. 12 is an explanatory drawing to show paraxial relations between elements of eyepiece optical system in Embodiment 6. It is, however, noted that the eyepiece optical system is illustrated as a refracting system. In the drawing, symbols are defined as follows.

y: the maximum object height in the image display surface y': the maximum image height in the virtual image plane f: the focal length of the eyepiece optical system s: the distance from the eyepiece optical system (curved reflecting surface) to the image display surface s': the distance from the eyepiece optical system to the virtual image plane e: the distance from the eyepiece optical system to the eye point 6

The following relations hold between these quantities.

$$\beta = -y'/y \quad (1)$$

$$f = s'/(\beta+1) \quad (2)$$

$$(1/s') - (1/s) = 1/f \quad (3)$$

$$D = -1000/(e-s') \quad (4)$$

In the equations,

β: the lateral magnification (a ratio of the virtual image size to the size of display image), and D: diopter [Diopter].

The units of the above various quantities all are mm except for β and D, and s, s', e are plus on the right side of the origin in the drawing.

The focal lengths of the curved reflecting surfaces and the locations of the respective elements are obtained using the above four equations. In the case of the present embodiment, because the image displaying means of the same display size are used, the two eyepiece optical systems have the equal maximum object height y. Accordingly, a need is to make the above quantities D, β coincident in the two eyepiece optical systems in order to make the diopters and magnifications thereof coincident.

In addition to common D and β, f, s, s' are obtained from Eqs. (2) to (4) by setting e for each eyepiece optical system, thereby determining the refractive powers of the eyepiece optical systems and the locations of the respective elements. In the case of Embodiment 6, the focal lengths of the respective curved reflecting surfaces and the locations of the respective elements may be determined for the two observing optical systems (eyepiece optical systems).

For example, supposing a virtual image with the diagonal length of 21 inches is made 1 m ahead from the eye point using the image displaying means with the diagonal length of 0.7 inch (y=8.9 mm) of display surface, Eq. (1) gives β=−30, and the quantities f, s, s' are obtained by setting e=40 mm, 50 mm, or 60 mm. Table 1 shows the results.

TABLE 1

|       | Location 1 | Location 2 | Location 3 |
|-------|------------|------------|------------|
| y mm  | 8.9        | 8.9        | 8.9        |
| y' mm | 267.0      | 267.0      | 267.0      |
| β     | −30.0      | −30.0      | −30.0      |
| D     | −1.0       | −1.0       | −1.0       |
| e mm  | 40.0       | 50.0       | 60.0       |
| f mm  | 33.1       | 32.8       | 32.4       |
| s mm  | −32.0      | −31.7      | −31.3      |
| s' mm | −960.0     | −950.0     | −940.0     |

A specific layout of Embodiment 6 can be determined by selecting two locations suitable for the layout of the image displaying apparatus that time out of these locations.

The image displaying apparatus of the present embodiment may employ a plurality of image displaying means having different sizes of display surfaces. Also in this case the positions and sizes of virtual images are preferably made coincident.

In this case the magnifications of the corresponding eyepiece optical systems may be set according to the sizes of the display surfaces. Namely, the lateral magnification β is obtained from Eq. (1) with the maximum object height y of each display surface and a desired virtual image size y', and then D and e are set to obtain f, s, s' from Eqs. (2) to (4), thereby determining the focal lengths of the curved reflecting surfaces and the locations of the respective elements.

For example, if the image displaying means of locations 2, 3 in Table 1 are changed to those with the diagonal length of 1.0 inch (y=12.7 mm) and with the diagonal length of 1.3 inches (y=16.5 mm) and if y', D, e are maintained at the same values as in Table 1, the quantities f, s, s' become as shown in Table 2 below.

TABLE 2

|       | Location 1 | Location 4 | Location 5 |
|-------|------------|------------|------------|
| y mm  | 8.9        | 12.7       | 16.5       |
| y' mm | 267.0      | 267.0      | 267.0      |
| β     | −30.0      | −21.0      | −16.2      |
| D     | −1.0       | −1.0       | −1.0       |
| e mm  | 40.0       | 50.0       | 60.0       |

TABLE 2-continued

|  | Location 1 | Location 4 | Location 5 |
|---|---|---|---|
| f mm | 33.1 | 47.5 | 61.8 |
| s mm | −32.0 | −45.2 | −58.0 |
| s' mm | −960.0 | −950.0 | −940.0 |

Further, using the same eyepiece optical systems, the positions and sizes of virtual images may be made coincident with the size of display surface of image displaying means as a variable. In this case, f and e are set to obtain s, s', β from Eqs. (2) to (4), and the display size y may be obtained from Eq. (1).

For example, if the focal lengths f in locations 4 and 5 in Table 2 are changed each to the focal length f=33.1 mm in location 1 and if y', D, e are maintained at the same values as in Table 2, the quantities y, s, s' are obtained as shown in Table 3 below.

TABLE 3

|  | Location 1 | Location 6 | Location 7 |
|---|---|---|---|
| y mm | 8.9 | 9.0 | 9.1 |
| y' mm | 267.0 | 267.0 | 267.0 |
| β | −30.0 | −29.7 | −29.4 |
| D | −1.0 | −1.0 | −1.0 |
| e min | 40.0 | 50.0 | 60.0 |
| f mm | 33.1 | 33.1 | 33.1 |
| s mm | −32.0 | −32.0 | −32.0 |
| s' mm | −960.0 | −950.0 | −940.0 |

In Table 3 the maximum heights y in locations 6, 7 correspond to display surfaces of the diagonal length 0.71 inch and the diagonal length 0.72 inch, respectively. There is, however, a problem in respect of the cost when the image displaying means having the display surfaces in such sizes are produced separately, and it is not practical. This problem can be solved by such an arrangement that the image displaying means are those having a display surface size greater than those values, effective image display regions having the maximum heights of the above values are set in portions on the display surfaces, and the display images are displayed only in the thus set portions.

For example, supposing the apparatus uses the image displaying means having the display surfaces of the diagonal length 0.72 inch and the images are displayed in effective image display regions defined in a 98% region and a 99% region of the respective display surfaces in the arrangements of locations 1, 6, the image displaying apparatus can be constructed as one for performing image synthesization using the same image displaying means and eyepiece optical systems.

Above locations 1 to 7 show paraxial arrangements of coaxial system, but the apparatus can also be constructed similarly by applying this to paraxial arrangements of decentering reflecting system. In that case, the sign of s in FIG. 12 is to be considered as plus.

Figure 13:
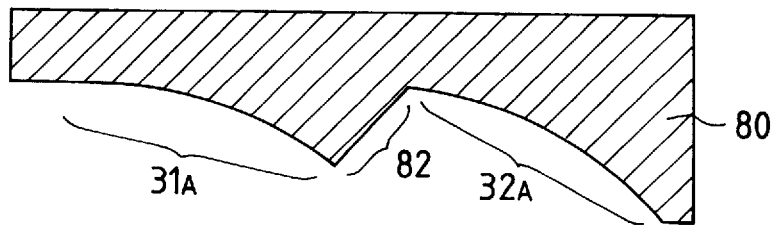
FIG. 13 is an explanatory drawing to illustrate a reflecting surface member integrally having a plurality of curved reflecting surfaces.

In the present embodiment the curved reflecting surfaces (synthesizer reflecting surfaces) 31, 32 are preferably formed in an integral manner similarly as in Embodiment 1. FIG. 13 is an explanatory drawing to show a reflecting surface member integrally including the two curved reflecting surfaces. This reflecting surface member 80 is produced by molding. In the drawing, $31_A$, $32_A$ are reflecting regions with an evaporated metal, and 82 a surface connecting the regions $31_A$, $32_A$ Here, the surface 82 is preferably formed in a flat or concave shape so as not to interrupt principal rays of reflected light from the curved reflecting surface $32_A$. Further, it is preferred to give an antireflection effect on the surface 82 by applying a flat coating or the like in order to suppress flare and ghost.

Figure 14:
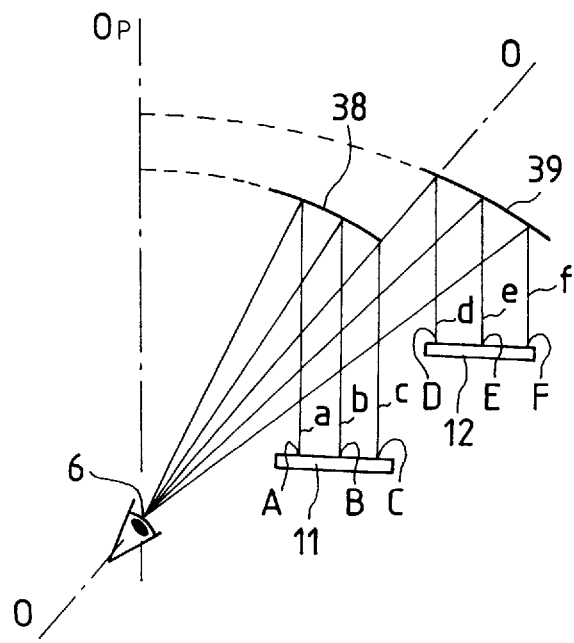
FIG. 14 is a schematic drawing of the major part of Embodiment 7 of the present invention.

FIG. 14 is a schematic drawing to show the major part of Embodiment 7 of the present invention. The present embodiment is featured in that the curved reflecting surfaces 31, 32 in Embodiment 6 are formed each as a paraboloid of revolution. In the drawing, numerals 38, 39 denote the paraboloid-of-revolution reflecting surfaces, and focuses thereof are coincident with the eye point 6. Principal rays of beams emerging from respective points on the image displaying means 11, 12 each are perpendicular to the display surfaces and parallel to the axis of each paraboloid of revolution.

The operation of the present embodiment is next explained. The principal rays of beams emerging from the respective points on the image displaying means 11, 12 all are outgoing perpendicular to the display surfaces to be incident to the paraboloid-of-revolution reflecting surfaces 38, 39. All rays incident in parallel with the axis of each paraboloid are converged at the eye point 6 of the focus thereof after reflected by the paraboloid.

Employing such a so-called telecentric optical system in which the principal rays from the display surfaces all are parallel on the side of image displaying means 11, 12, particularly when the image displaying means are liquid crystal panels having strong directivity in the vertical direction to the display surfaces, beams with high contrast can be guided under the same conditions from the respective points on the display surfaces to the observing optical systems (paraboloid-of-revolution reflecting surfaces), thus achieving the image quality with good contrast.

Further, the above arrangement has such a merit that decentering distortion does not occur because principal rays at each field angle are guided in a rotationally symmetric state to the focus of the paraboloid of revolution.

In the case where the image displaying means 11, 12 employed are reflection type display devices in which a lot of micro-mirrors are arranged in a grid pattern and angles thereof can be controlled in units of these micro-mirrors, image display needs to be performed as controlling incidence or non-incidence of reflected light to the eye point 6 in units of micro-mirrors. When an eyepiece optical system is telecentric on the display surface side, angles of incidence of principal rays from the above reflection type display device to the eyepiece optical system are equal throughout all field angles (the entire display surface), thus presenting a merit that the angle control of each micro-mirror can be performed by a same method.

Figure 15:
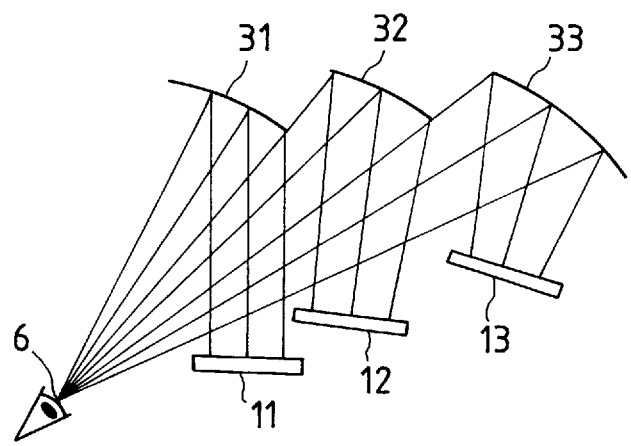
FIG. 15 is a schematic drawing of the major part of Embodiment 8 of the present invention.

FIG. 15 is a schematic drawing to show the major part of Embodiment 8 of the present invention. The present embodiment has a layout similar to that of Embodiment 6, and is an embodiment of the image displaying apparatus arranged in such a manner that display images on three image displaying means 11, 12, 13 are serially combined by three curved reflecting surfaces (synthesizer reflecting surfaces) 31, 32, 33 constituting the observing optical system.

The present embodiment can obtain a higher-definition synthetic virtual image because it is synthesized from the images from the three image displaying means. The observer observes the synthetic image of the plural images located on a line, as a horizontally elongate wide-aspect synthetic virtual image.

FIGS. 16A and 16B are schematic drawings to show the major part of Embodiment 9 of the present invention. The observing optical system of the present embodiment is composed of a relay optical system for forming an intermediate image of the display images, and an eyepiece lens (eyepiece optical system), and image synthesization is effected by setting the curved reflecting surfaces (synthesizer reflecting surfaces) in parts of the relay optical system.

In the drawings, numeral 60 denotes a lens, and each of the curved reflecting surfaces 31, 32 and the lens 60 is an element of the relay optical system. Numeral 51 designates the eyepiece lens (eyepiece optical system), and 70 an intermediate image plane. Further, each of the relay optical system and the eyepiece lens 51 is an element of the observing optical system.

The operation of the present embodiment is next explained. Beams emerging from the image displaying means 11, 12 are combined into one beam through the curved reflecting surfaces (synthesizer reflecting surfaces) 31, 32.

This principle of image synthesization is the same as in the case of the curved reflecting surfaces 31, 32 being used as the eyepiece optical systems in Embodiment 6, and the locational conditions of the curved reflecting surfaces 31, 32 are also the same. Namely, the curved reflecting surface 31 is positioned so as not to interrupt principal rays of an effective beam reflected by the curved reflecting surface 32 and so that the principal rays from the edges $E_1$, $E_1'$ passing the predetermined points (C and D) on the respective image displaying means 11, 12 may coincident with each other after reflected by the respective curved reflecting surfaces 31, 32.

The beam synthesized by the curved reflecting surfaces 31, 32 forms an aerial image on the intermediate image plane 70 through the lens 60 and the beam from the intermediate image plane 70 is incident to the eye point 6 through the eyepiece 51.

The total optical system of the present embodiment is composed of the relay optical system consisting of the curved reflecting surfaces 31, 32 and the lens 60, and the eyepiece optical system 51. This arrangement permits the image displaying apparatus to be constructed so as to be mounted along the observer's head by placing a return mirror in the optical path from the curved reflecting surfaces 31, 32 to the lens 60 or in the optical path from the lens 60 to the eyepiece 51, thus achieving the image display apparatus with a less projecting portion and in a good weight balance.

If the lateral magnification of the relay optical system is set greater than a desired lateral magnification β of the total system, the lateral magnification of the eyepiece 51 becomes smaller in inverse proportion thereto, thus permitting the focal length of the eyepiece 51 to be set longer. This facilitates correction for off-axis aberration of the eyepiece 51 when the field angle of the image displaying apparatus is set wide, and it also permits the eyepiece 51 to be constructed of a smaller number of lens elements. Therefore, the image displaying apparatus can be provided with good image quality as being of a wide field angle.

If the display sizes of the image displaying means 11, 12 are equal to each other, the first optical system composed of the lens 60 and the curved reflecting surface 31 preferably has the lateral magnification equal to that of the second optical system composed of the lens 60 and the curved reflecting surface 32. Since the optical pathlength from the lens 60 to the curved reflecting surface 31 is different from that from the lens 60 to the curved reflecting surface 32, the first and second optical systems must have different element refractive powers and element locations.

Next explained is how to obtain the element refractive power and element location of each optical system in this case. The first or second optical system in the present embodiment has a two-group arrangement consisting of a first group of a positive lens (concave reflecting surface) and a second group of a positive lens (lens 60) in order from the display surface side.

FIG. 17 is an explanatory drawing to show paraxial relations between elements in the two-group optical system. It is, however, noted that the curved reflecting surface is illustrated as a refracting system. In the drawing, numeral 17 represents the display surface of image, 31 the lens (concave reflecting surface) of the first group, 60 the lens of the second group, and 70 the intermediate image plane. Further, various quantities are defined as follows.

f: the focal length of the total optical system
$f_1$: the focal length of the first group
$f_2$: the focal length of the second group
$e_0$: the principal point separation from the display surface to the first group
$e_1$: the principal point separation from the first group to the second group
$e_2$: the principal point separation from the second group to the intermediate image plane The following relations hold between these various quantities.

$$f_1 = (e_0 * f_2 * \beta)/\{e_2 + f_2*(\beta-1)\} \qquad (5)$$

$$e_1 = f_2*(e_0*\beta + e_2)/(e_2 - f_2) \qquad (6)$$

$$1/f = \{1/f_1\} + \{1/f_2\} - e_1/(f_1*f_2) \qquad (7)$$

In the equations, β: the lateral magnification of the total system.

The various quantities except for β are plus on the right side of the origin in FIG. 17.

Refractive powers of the two lenses constituting the first or second optical system and locations of the respective optical elements will be obtained from the above equations.

Here, when the display sizes of the display surfaces are the same in the first and second optical systems and if the lateral magnifications β of the total systems are equal, the image sizes are coincident on the intermediate image plane 70. Then the common eyepiece optical system can be used after the intermediate image plane 70.

Further, if the second group is also used in common in the plurality of above optical systems, $f_2$, $e_2$, β become common in the above equations, and the refractive powers and optical locations of the optical elements in each optical system can be determined by obtaining $f_1$ and $e_1$ from Eqs. (5) and (6) for different $e_0$.

For example, if $e_0$ is changed to be 15, 20, or 25 mm for $f_2$=35 mm, $e_2$=60 mm, and β=−2, the quantities $f_1$, $e_1$, f are given as shown in Table 4 below.

TABLE 4

|  | Location 8 | Location 9 | Location 10 |
|---|---|---|---|
| $f_1$ mm | 23.3 | 31.1 | 38.9 |
| $f_2$ mm | 35.0 | 35.0 | 35.0 |
| f mm | 50.0 | 28.6 | 22.7 |
| $e_0$ mm | 15.0 | 20.0 | 25.0 |
| $e_1$ mm | 42.0 | 28.0 | 14.0 |
| $e_2$ mm | 60.0 | 60.0 | 60.0 |
| β | −2.0 | −2.0 | −2.0 |

A specific layout of Embodiment 9 can be determined by selecting two locations suitable for the arrangement of the image displaying apparatus at that time out of these locations.

Further, the present embodiment may be modified to use a plurality of image displaying means having different display sizes of display surfaces. Also in this case a need is to make the image sizes of the intermediate images by the respective optical systems coincident with each other. In this case, the refractive powers and optical locations of the optical elements in each optical system can be determined by setting the lateral magnification β of each optical system to the image size of intermediate image, using common $f_2$ and $e_2$ in Eqs. (5) and (6), and obtaining $f_1$ and $e_1$ for different $e_0$.

For example, if $f_2$, $e_2$, $e_0$ in Table 4 are kept at the same values and the lateral magnifications in locations 8, 9 are changed to $-3$ and $-2.5$, respectively, the various quantities $f_1$, $e_1$, f are given as shown in Table 5 below.

TABLE 5

|  | Location 11 | Location 12 | Location 10 |
| --- | --- | --- | --- |
| $f_1$ mm | 19.7 | 28.0 | 38.9 |
| $f_2$ mm | 35.0 | 35.0 | 35.0 |
| f mm | 20.5 | 20.0 | 22.7 |
| $e_0$ mm | 15.0 | 20.0 | 25.0 |
| $e_1$ mm | 21.0 | 14.0 | 14.0 |
| $e_2$ mm | 60.0 | 60.0 | 60.0 |
| β | −3.0 | −2.5 | −2.0 |

Above locations 10 to 12 show paraxial locations of coaxial system, but the apparatus can also be constructed similarly by applying this to paraxial locations of decentering reflection system.

It is preferred to set the distances from the intermediate image plane 70 to exit pupils of the first and second optical systems substantially equal to each other in the first and second optical systems in Embodiment 9. This makes the pupil of each optical system conjugate with the eye point 6, which can suppress vignetting for all beams from the display surfaces, thus giving no variation of light quantity in each display surface unit.

Figure 18:
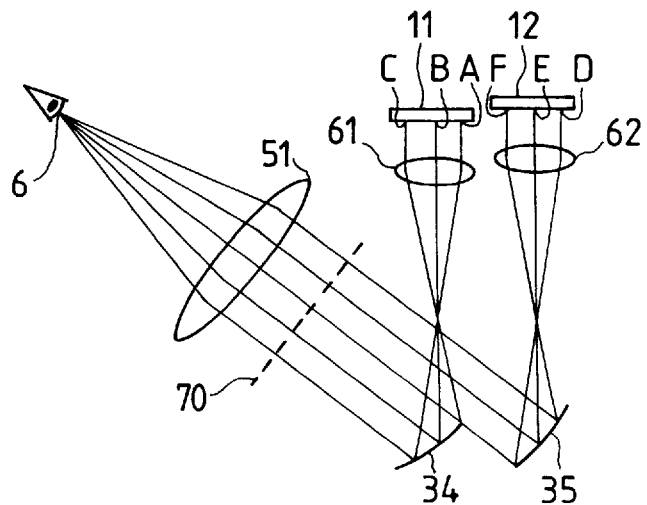
FIG. 18 is a schematic drawing of the major part of Embodiment 10 of the present invention.

FIG. 18 is a schematic drawing to show the major part of Embodiment 10 of the present invention. Embodiment 9 was arranged to perform image synthesization by placing the curved reflecting surfaces on the side near the display surfaces in the relay optical system, whereas the present embodiment is arranged to perform image synthesization by placing the curved reflecting surfaces on the side of intermediate image plane 70 in the relay optical system.

In the drawing, numerals 61, 62 denote lenses, 34, 35 curved reflecting surfaces (synthesizer reflecting surfaces), 70 an intermediate image plane, and 51 an eyepiece. Each of the lenses 61, 62 and the curved reflecting surfaces 34, 35 is an element of the relay optical system, and each of the relay optical system and the eyepiece 51 is an element of the observing optical system.

The operation of the present embodiment is next explained. A beam emerging from the image displaying means 11 forms an aerial image on the intermediate image plane 70 through the lens 61 and curved reflecting surface 34. Similarly, a beam emerging from the image displaying means 12 forms an aerial image on the intermediate image plane 70 through the lens 62 and curved reflecting surface 35. In this case, the curved reflecting surfaces 34, 35 are positioned under the same conditions as the curved reflecting surfaces 31, 32 in Embodiment 9 are positioned. Namely, the curved reflecting surface 34 is positioned so as not to interrupt principal rays of an effective beam reflected by the curved reflecting surface 35 and so that the principal rays from the edges $E_1$, $E_1'$ passing the predetermined points (C and D) on the respective image displaying means 11, 12 may coincide with each other after reflected by the respective curved reflecting surfaces.

A beam from the intermediate image plane 70 is incident to the eye point 6 through the eyepiece 51. Since this arrangement combines the images on the side of intermediate image plane 70 in the relay optical system, the arrangement has high freedom degrees as to the location of the relay optical system of from the image displaying means 11, 12 to the curved reflecting surfaces 34, 35. Namely, the optical system up to the curved reflecting surfaces 34, 35 may be freely located within the range not eclipsing beams with each other in the relay optical system. For example, a return mirror may be placed in an optical path of the relay optical system to spatially superimpose a part of the optical path of the relay optical system on another part thereof, which gives an effect of compactifying the apparatus.

Figure 19:
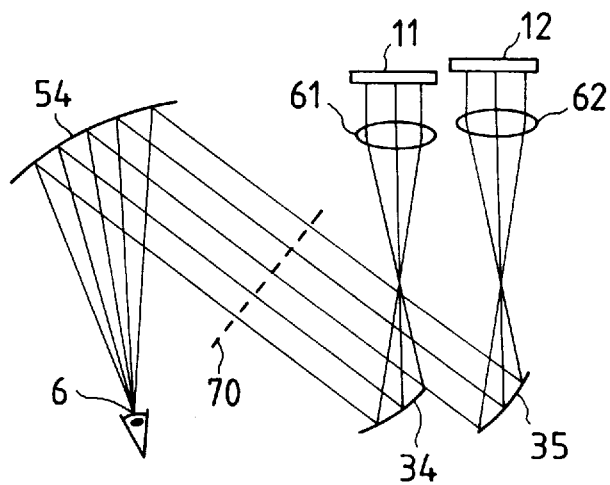
FIG. 19 is a schematic drawing of the major part of Embodiment 11 of the present invention.

FIG. 19 is a schematic drawing to show the major part of Embodiment 11 of the present invention. The present embodiment is an example in which a curved reflecting surface 54 replaces the eyepiece 51 of Embodiment 10. Since the outer diameter of the eyepiece 51 in Embodiment 10 becomes greater approximately in proportion to the tangent of a half field angle when the virtual image is observed from the eye point 6, the weight of the eyepiece 51 increases as the field angle becomes larger. Therefore, a compact and light apparatus can be obtained by forming the eyepiece optical system of a single curved reflecting mirror 54.

If the curved reflecting surface 54 is constructed by a half mirror having both transmission and reflection effects, it becomes possible for the observer to observe a virtual image of the display images over the external view ahead of the observer.

Figure 20:
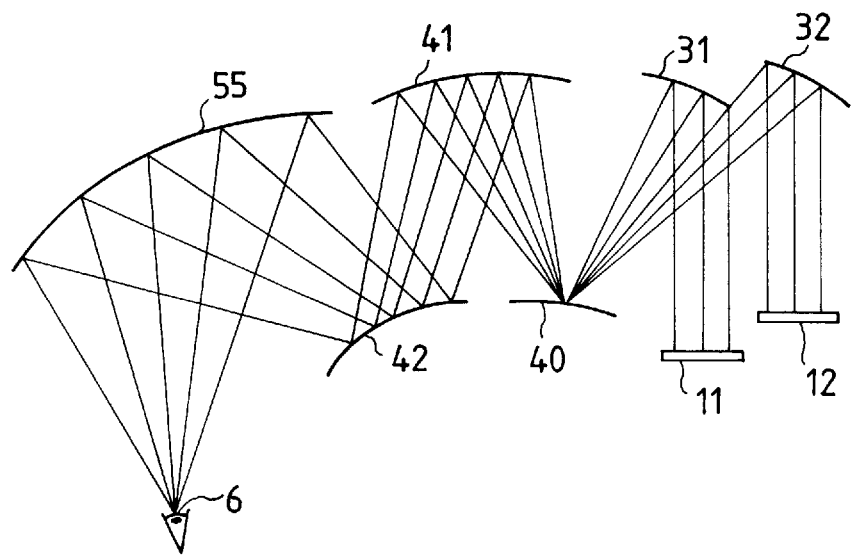
FIG. 20 is a schematic drawing of the major part of Embodiment 12 of the present invention.

FIG. 20 is a schematic drawing to show the major part of Embodiment 12 of the present invention. The present embodiment is an embodiment in which the relay optical system and eyepiece optical system all are formed as reflecting surfaces. In the drawing, numerals 31, 32 denote respective curved reflecting surfaces, which are synthesizer reflecting surfaces for reflecting beams emerging from the image displaying means 11, 12 to combine them into one beam. Its method is the same as in the case of Embodiment 9. Curved reflecting surfaces 40, 41 reflect a beam thus synthesized to form an intermediate image near a curved reflecting surface 42. The curved reflecting surface 42 reflects the beam to guide it to a curved reflecting surface 55 being the eyepiece optical system, and the curved reflecting surface 55 reflects the beam toward the eye point 6 to form a virtual image ahead of the observer. Each of the curved reflecting surfaces 31, 32, 40, 41, 42 is an element of the relay optical system, and each of the relay optical system and curved reflecting surface 55 is an element of the observing optical system.

This arrangement enables to form a very light image displaying apparatus. If the reflecting surfaces are partially or totally formed in an integral manner, adjustment of positions and angles becomes easier upon assembling the apparatus.

Also in each of these Embodiment 9 to Embodiment 12, the image displaying means are CRTs, transmission type liquid crystal panels, reflection type liquid crystal panels, or reflection type display devices in which a lot of micromirrors are arranged in a grid pattern and angles thereof can be controlled in units of these micro-mirrors, similarly as in Embodiment 1. It becomes necessary to set a new illumination optical system for using the reflection type liquid crystal panels or the reflection type display devices among these image displaying means, and it may be arranged in such a manner that illumination light is supplied obliquely to the display surfaces or normally to the display surfaces by setting a half mirror or the like between the image displaying means and the observing optical system. In this case, the present embodiment may employ the arrangement of the relay optical system having longer distances from the image display surfaces to the first surfaces, thereby facilitating guide of the illumination light to the image display surfaces.

An image displaying apparatus with good utilization factor of light can be attained by using panels of polymer dispersed liquid crystal, for example PDLC (Polymer Dispersed Liquid Crystal) panels as reflection type liquid crystal panels.

Figure 21:
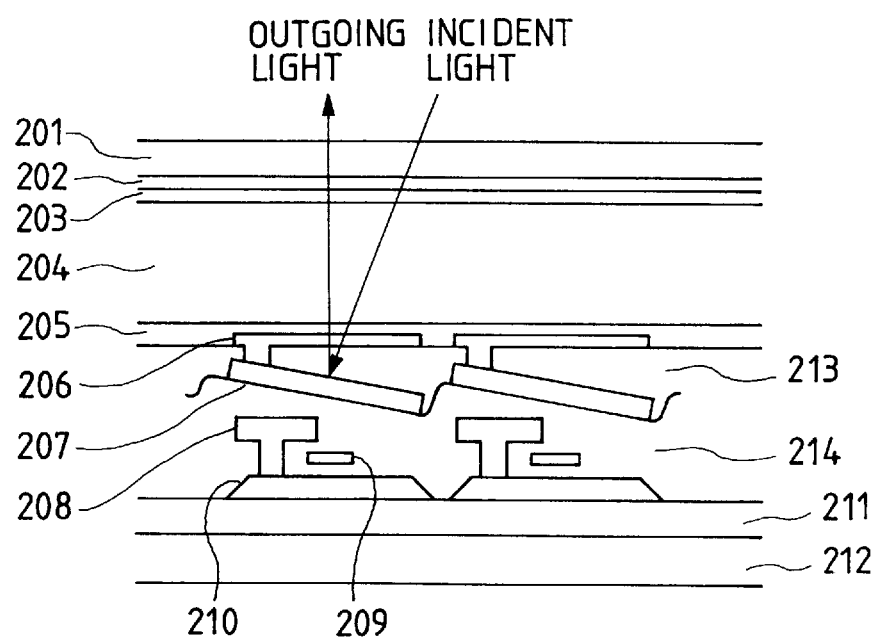
FIG. 21 is an explanatory drawing of a setup of a reflection type PDLC panel.

FIG. 21 is an explanatory drawing to show a structure of a reflection type PDLC panel used in the present invention. In the drawing, numeral 201 designates a glass plate to be an opposed substrate, 202, 206 transparent electrodes, 203, 205 oriented films, 204 a PDLC layer, 207 a reflection electrode, 208 signal line wiring, 209 gate polysilicon of a TFT in each pixel portion, 210 a polysilicon layer forming the TFT in each pixel portion, 211 an insulating layer, 212 a silicon substrate, and 213, 214 interlayer films.

Next explained is the operational principle of the PDLC panel. The PDLC layer 204 changes its diffusing state of light with application of a voltage to the transparent electrodes 202, 206. Namely, orientations of liquid crystals are aligned in polymer balls with application of voltage, so that incident light becomes transmitted light as it is. Without application of voltage orientations of liquid crystals are disordered, so that incident light becomes scattered light. Thus, image display becomes possible by controlling the applied voltage in pixel units as defining the transmitted light as a bright state and the scattered light as a dark state.

Since in the structure of FIG. 21 the incident light from the illumination system travels twice, forward and backward, through the PDLC layer 204, the degree of scattering of light becomes more enhanced in the dark state. Thus, the contrast obtained in that case corresponds to that of a transmission type PDLC panel having an approximately doubled PDLC layer.

The TN (Twisted Nematic) type liquid crystal panel normally used needs a polarizer and thus has a defect that losses of light quantity due to the polarizer are great. In contrast with it, the PDLC panel controls the bright and dark states of light without using the polarizer as described above, and thus has a merit of very high utilization factor of light.

The reflection type PDLC panel of FIG. 21 is characterized in that the reflection electrode 207 is set as inclined. This makes it possible to guide the illumination light obliquely into the panel and to let the reflected light go out normally to the panel face. This enables the PDLC panel to be obliquely illuminated and can obviate a need to place a half mirror or the like in front of the PDLC panel, which presents a merit of being free of losses of light quantity occurring at the half mirror.

Oblique illumination of panel causes the light to be reflected obliquely on the front and back faces of the opposed substrate 201, and thus, the reflected light can be separated from the light as an image from the reflection electrode 207, which presents another merit of improving the contrast as decreasing occurrence of ghost and flare.

The inclined electrode is formed as follows. The polysilicon layer 210, the polysilicon 209 of gate, and the signal line wiring 208 are arranged in order as shown in FIG. 21, thus forming oblique steps. The local steps are smoothed by resist etch back or the like, thereby shaping the interlayer film 214 as shown in FIG. 21. The electrode 207 is formed here, and thereafter the interlayer film 213 is formed to flatten the surface. Then contact is achieved between the reflection electrode 207 and the transparent electrode 206. This arrangement makes the electric field uniform between the flattened transparent electrode 206 and the opposed electrode 202, thus causing no distribution unevenness.

Figure 22:
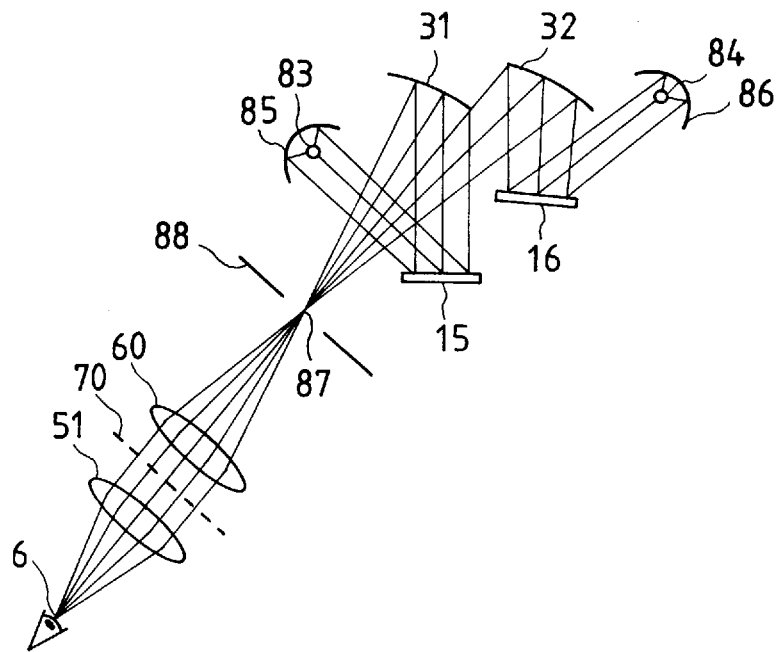
FIG. 22 is a schematic drawing of the major part of Embodiment 13 of the present invention.

FIG. 22 is a schematic drawing to show the major part of Embodiment 13 of the present invention. The present embodiment is an embodiment in which the image displaying means 11, 12 of Embodiment 9 are replaced by the reflection type PDLC panels shown in FIG. 21. In the drawing, numerals 15, 16 designate the image displaying means comprised of the reflection type PDLC panels in the structure of FIG. 21. Numerals 83, 84 represent light sources. Numeral 85 or 86 is a reflector, which guides light from the corresponding light source 83, 84 to the reflection type PDLC panel 15 or 16. Numeral 87 denotes a position of the pupil of the relay optical system, and 88 an aperture placed approximately at the position of the pupil of the relay optical system.

The operation of the present embodiment is next explained. The illumination light from the light source 83, 84 travels via the reflector 85, 86 to illuminate the each reflection type PDLC panel 15, 16 in the form of nearly parallel light. Since the reflection electrode 207 in the reflection type PDLC panel 15, 16 is inclined as shown in FIG. 21, the reflected light emerges in a direction different from that of the incident light. This outgoing light is incident to the curved reflecting surface 31, 32 and thereafter reaches the observer's pupil through the relay optical system and eyepiece optical system 51.

In this case the reflection type PDLC panels 15, 16, the light sources 83, 84, and the reflectors 85, 86 are positioned so that principal rays of light beams emerging from the respective pixels of the reflection type PDLC panels 15, 16 may reach the pupil position 87 of the relay optical system. This arrangement keeps the light sources 83, 84 and the pupil position 87 in a conjugate relation with each other. In Embodiment 13 the aperture 88 is placed at the pupil position 87 of the relay optical system, thereby forming a Schlieren optical system to the plurality of illumination systems.

Figure 23:
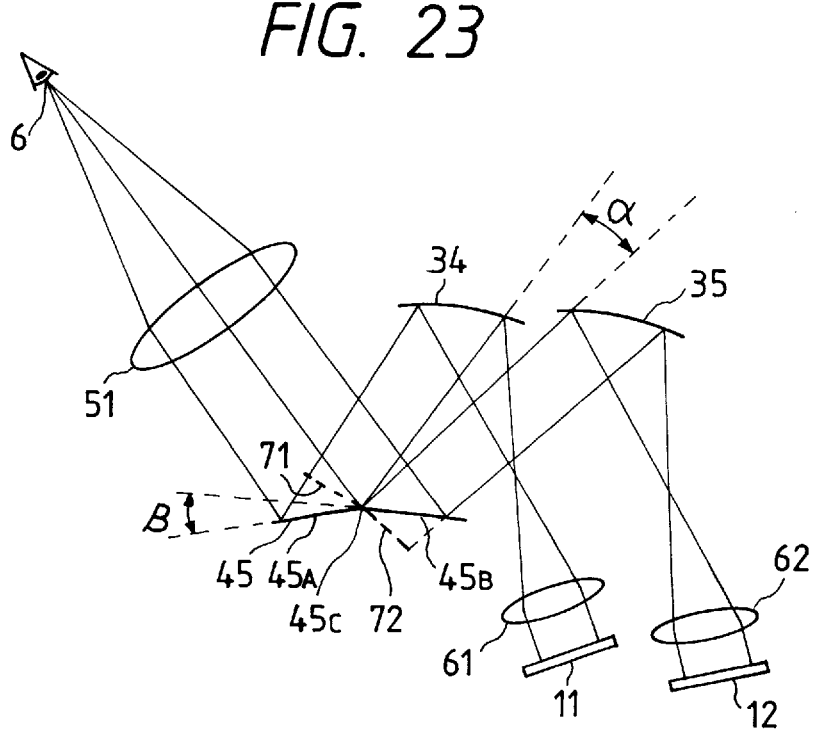
FIG. 23 is a schematic drawing of the major part of Embodiment 14 of the present invention.

Here, if the pixels in the reflection type PDLC panels 15, 16 are in the dark state, the illumination light is scattered by PDLC. Then, if a part of the scattered light should pass through the pupil 87 of the relay optical system, the contrast would be lowered. It is thus necessary to cut the scattered light from PDLC in the dark state as much as possible in order to obtain a virtual image with high contrast. The aperture 88 has an effect to cut such detrimental scattered light, so that the observer can observe a virtual image with high contrast by shutting the diffusing light off by the aperture FIG. 23 is a schematic drawing to show the major part of Embodiment 14 of the present invention. The present embodiment is different from Embodiment 10 in that Embodiment 10 was arranged to perform image synthesization in the middle of the optical path of the relay optical system by making the principal rays of some of reflected light by the curved reflecting surfaces (synthesizer reflecting surfaces) 34, 35 coincident with each other, whereas the present embodiment is arranged to perform image synthesization on the intermediate image planes of the relay optical system.

In the drawing, numerals 11, 12 denote image displaying means, 61, 62 lenses, and 34, 35 curved reflecting surfaces. Numeral 45 denotes a discontinuous composite reflecting surface, which is composed of two flat reflecting surfaces $45_A$, $45_B$ and which is positioned approximately at the image plane of the relay optical system. Further, $45_C$ is a ridgeline formed by the two flat reflecting surfaces $45_A$, $45_B$ constituting the composite reflecting surface 45. Numeral 51 designates an eyepiece lens for observing the intermediate image formed by the relay optical system.

Each of the lens 61, the curved reflecting surface 34, the lens 62, the curved reflecting surface 35, etc. is an element of the relay optical system. Each of the relay optical system, eyepiece 51, and flat reflecting surfaces $45_A$, $45_B$ is an element of the observing optical system.

The operation of the present embodiment is next explained. A light beam emerging from the image displaying means 11 forms an intermediate image on the intermediate image plane 71 through the first optical system consisting of the lens 61 and the curved reflecting surface 34. Similarly, a light beam emerging from the image displaying means 12 forms an intermediate image on the intermediate image plane 72 through the second optical system consisting of the lens 62 and the curved reflecting surface 35. On this occasion the two intermediate images are formed next to each other, and each optical system and the composite reflecting surface 45 are positioned so that an intermediate image of the edge $E_1$, $E_1'$ passing the predetermined point (C and D) on the image displaying means 11, 12 may be focused on the ridgeline $45_C$ of the composite reflecting surface 45.

Thus, the two intermediate images 71, 72 in Embodiment 14 are formed in such a state that the edges $E_1$, $E_1'$ of the two rectangular intermediate images are connected at the ridgeline $45_C$ of the composite reflecting surface 45. Accordingly, a line (adjacent line) at which the two intermediate images are adjacent to each other is located on the ridgeline formed by the reflecting surfaces corresponding to the respective intermediate images. Inclinations of the two faces constituting the composite reflecting surface 45 are determined so that principal rays from the first and second optical systems may coincide with each other on the eyepiece side after reflected at the ridgeline $45_C$. The flat reflecting surfaces $45_A$, $45_B$ are synthesizer reflecting surfaces accordingly.

Namely, the reflecting surface 45 is formed so that an angle α which the principal rays from the first and second optical systems in Embodiment 14 make at the edge $45_C$ connecting them may become equal to an angle β which the two faces of the composite reflecting surface 45 make. Since this arrangement allows the reflection beams reflected by the composite reflecting surface 45 to become a light beam of a synthetic image obtained by combining two images, the light beams from the respective optical systems can be guided to the eye point 6 by a single eyepiece 51.

The present embodiment employs the above arrangement to connect two images by the flat reflecting surfaces $45_A$, $45_B$ at the intermediate image planes 71, 72 to synthesize an image. Therefore, the flat reflecting surfaces $45_A$, $45_B$ are the synthesizer reflecting surfaces in the present embodiment. This enables image synthesization without losses of light quantity, because all light beams determined by NA on the display surface side of the relay optical system can be made incident to the eyepiece.

In the present embodiment, the relay optical system forms the intermediate images of the respective display images next to each other, the observing optical system has a same number of (two each in the present embodiment) reflecting surfaces per image displaying means for reflecting only the light beams from the display images in correspondence to the image displaying means to the pupil, and the reflecting face (the flat reflecting surface $45_A$ or $45_B$) closest to the observer's pupil in correspondence to each image displaying means is located nearly on the image plane of the relay optical system.

Figure 24:
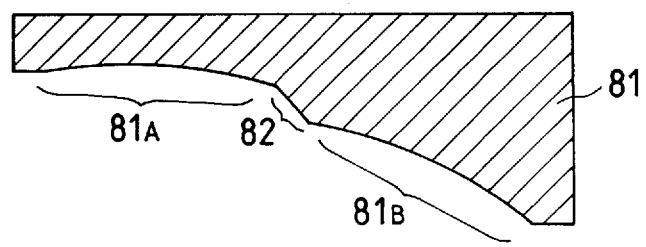
FIG. 24 is an explanatory drawing to illustrate a reflecting surface member integrally having a plurality of curved reflecting surfaces.

The curved reflecting surfaces 34, 35 are preferably formed in an integral manner. FIG. 24 is an explanatory drawing to show a reflecting surface member 81 in which the two curved reflecting surfaces are integrally formed. This reflecting surface member 81 is produced by molding. In the drawing, $81_A$, $81_B$ are reflecting regions on which a metal is deposited by vapor deposition, and 82 a surface connecting the regions $81_A$, $81_B$. This arrangement obviates a need to adjust the relative positional and angular deviation of the reflecting regions $81_A$, $81_B$, which requires no adjusting member, thus realizing compactification and weight reduction of the entire apparatus.

Figure 25:
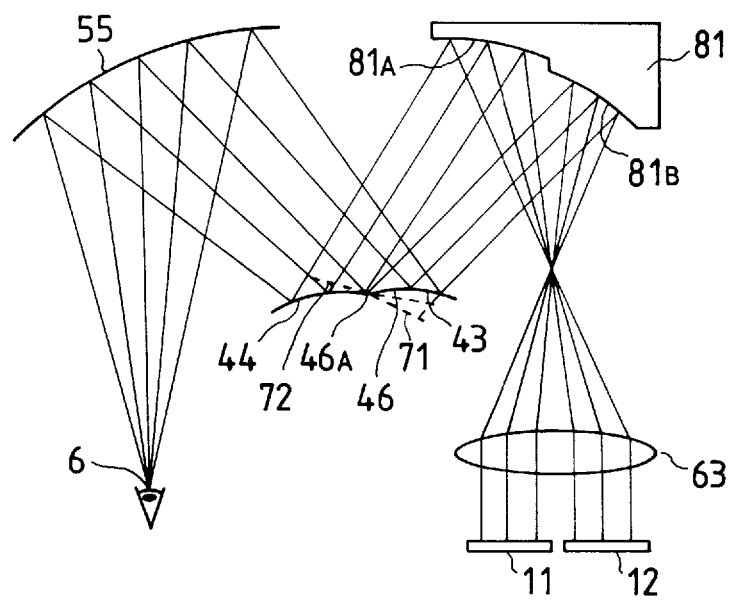
FIG. 25 is a schematic drawing of the major part of Embodiment 15 of the present invention.

FIG. 25 is a schematic drawing to show the major part of Embodiment 15. The present embodiment is an embodiment in which the relay optical system is composed of one lens, an integral reflecting surface member, and two curved reflecting surfaces located near the intermediate image planes, and the eyepiece is a curved reflecting surface.

In the drawing, numeral 63 represents a lens, and 81 a reflecting surface member in which two reflecting surfaces $81_A$, $81_B$ are integrally formed. Numeral 46 is a composite curved reflecting surface, which is composed of two curved reflecting surfaces 43, 44 and in which $46_A$ is a ridgeline formed by the two curved reflecting surfaces 43, 44. Numeral 55 designates a curved reflecting surface (eyepiece optical system).

Each of the lens 63 and the curved reflecting surfaces $81_A$, $81_B$ is an element of the relay optical system. Further, each of the relay optical system, the eyepiece optical system 55, and the curved reflecting surfaces 43, 44 is an element of the observing optical system.

The operation of the present embodiment is next explained. A light beam emerging from the image displaying means 11 forms an intermediate image on the intermediate image plane 71 through the first optical system consisting of the lens 63 and the curved reflecting surface $81_B$. Similarly, a light beam emerging from the image displaying means 12 forms an intermediate image on the intermediate image plane 72 through the second optical system consisting of the lens 63 and the curved reflecting surface $81_A$. In this case, the optical elements and the composite curved reflecting surface 46 are positioned so that the two intermediate images may be formed next to each other and so that intermediate images of the edges $E_1$, $E_1'$ passing the predetermined points (C and D) on the image displaying means 11, 12 may be focused on the ridgeline $46_A$ of the composite curved reflecting surface 46.

Thus, the two intermediate images 71, 72 in the present embodiment are formed in such a state that the edges $E_1$, $E_1'$ of the two rectangular intermediate images are connected at the ridgeline 46A of the composite curved reflecting surface 46. Accordingly, a line (adjacent line) on which the two intermediate images are adjacent to each other is located on the ridgeline formed by the curved reflecting surfaces (synthesizer reflecting surfaces) corresponding to the respective intermediate images. The two curved reflecting surfaces 43, 44 constituting the composite curved reflecting surface 46 are connected in such a relation that the principal rays from the first and second optical systems after reflected are nearly coincident on the ridgeline $46_A$ on the eyepiece side.

The composite curved reflecting surface 46 reflects the incident light beams to guide them to the curved reflecting surface 55. Further, the curved reflecting surface 55 serves as an eyepiece optical system to guide the light beams to the eye point 6.

In the present embodiment the composite curved reflecting surface 46 is a composite surface of the surfaces having respective curvatures as shown in the drawing. This arrangement has a similar effect to a field lens positioned near the intermediate images, so that principal rays at respective field angles are incident in a diverging state to the curved reflecting surface 55 as keeping the outer diameter of the relay optical system small, thus compactifying the entire apparatus as being of a wide angle.

Since each of the lens and the reflecting surfaces composing the relay optical system in the present embodiment is integrally formed, it is not necessary to perform positioning between the edge of each intermediate image connected and the ridgeline $46_A$ of the composite curved reflecting surface 46 for each of the first and second optical systems, thus facilitating adjustment of positions and angles of the optical elements.

Since the eyepiece optical system is the curved reflecting surface 55, the image displaying apparatus is formed in a wide angle and in a light weight. Further, if the eyepiece optical system is formed as a half mirror, the image displaying apparatus can be formed as a so-called see-through image displaying apparatus, which permits the observer to observe a superimposed image of the display image on the external view.

In the present embodiment, the relay optical system forms the intermediate images of the display images next to each other, the observing optical system has a same number of (two each in the present embodiment) reflecting surfaces per image displaying means for reflecting only the light beams from the display images corresponding to the image displaying means to the pupil, and the reflecting surface (the flat reflecting face 43 or 44 in the present embodiment) closest to the observer's pupil in correspondence to each image displaying means is located nearly on the image plane of the relay optical system.

The reflecting surface 46 may be replaced by a reflecting surface composed of two flat faces as in Embodiment 14.

Figure 26:
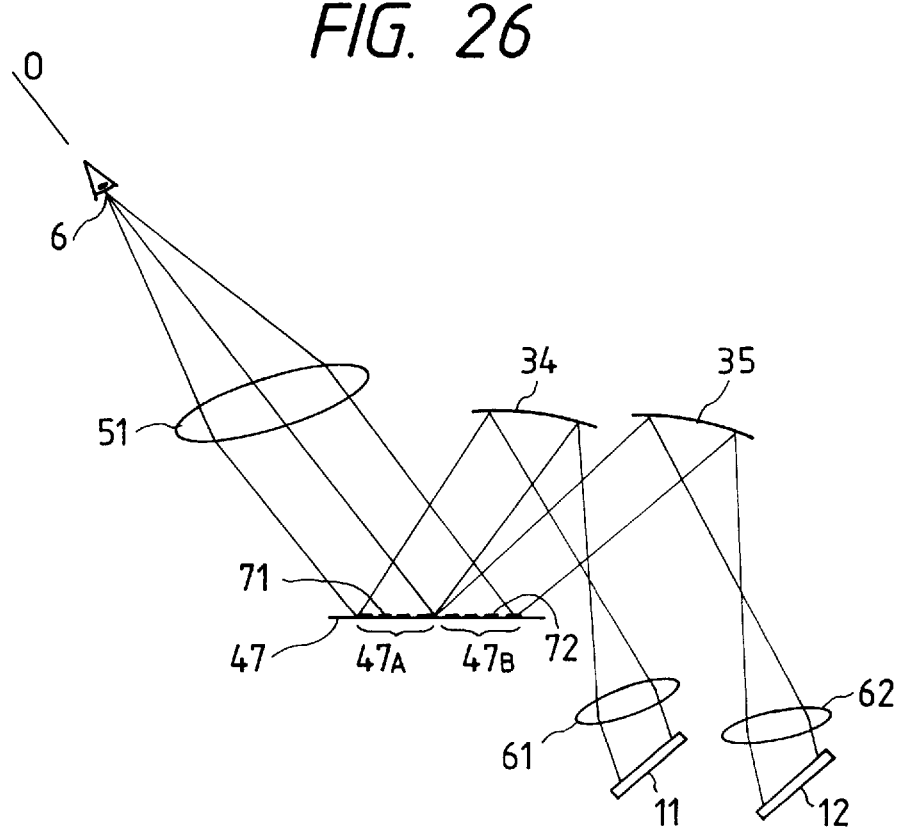
FIG. 26 is a schematic drawing of the major part of Embodiment 16 of the present invention.

FIG. 26 is a schematic drawing to show the major part of Embodiment 16. The present embodiment is different from Embodiment 14 in that the synthesizer reflecting surfaces located near the intermediate image planes are formed as a single diffusion reflecting surface and the elements of the relay optical system are further arranged as decentering optical systems to make the image planes of the relay optical system nearly coincident with the diffusion reflecting surface. In the drawing, numeral 47 stands for a flat diffusion reflecting surface, and the image plane of the first optical system composed of the lens 61 and the curved reflecting surface 34 is combined on the diffusion reflecting surface 47 with the image plane of the second optical system composed of the lens 62 and the curved reflecting surface 35.

For that purpose, the each image displaying means 11, 12 and lens 61, 62 compose a decentering optical system in the first or second optical system, respectively, so as to form a synthetic image of the display images on the respective display surfaces, on the diffusion reflecting surface 47; that is, the two images are combined on one plane.

Further, the eyepiece 51 is set as inclined relative to the axis O (the axis connecting the center of the observer's pupil with the center of the virtual image) so as to form a virtual image at a predetermined distance ahead of the observer from the intermediate image on the diffusion reflecting surface 47. This arrangement permits the observer to observe the synthetic image without precisely performing angular adjustment of the eyepiece 51 against the synthetic image formed on the diffusion reflecting surface 47, which simplifies the setup of apparatus.

This diffusion reflecting surface 47 is preferably formed in such a manner that a region $47_A$ in which the display image on the image displaying means 11 is focused is different in diffusion characteristics from a region $47_B$ in which the display image on the image displaying means 12 is focused. In detail, the region $47_A$ is arranged to have such diffusion characteristics as to have a peak of a reflected light quantity in a direction in which the axial principal ray of a beam incident from the curved reflecting surface 34 is incident to the eyepiece 51, and the region $47_B$ is arranged to have such diffusion characteristics as to have a peak of a reflected light quantity in a direction in which the axial principal ray of a beam incident from the curved reflecting surface 35 is incident to the eyepiece 51, which decreases losses of light quantity very much.

More preferably, the optical system is arranged to be telecentric on the intermediate image plane side of the curved reflecting surfaces 34, 35. This arrangement makes principal rays at all field angles incident to the diffusion reflecting surface 47 in a parallel state, which gives an effect of not causing the light quantity unevenness depending upon the field angles when the region $47_A$ and region $47_B$ have the above respective characteristics.

Figure 27:
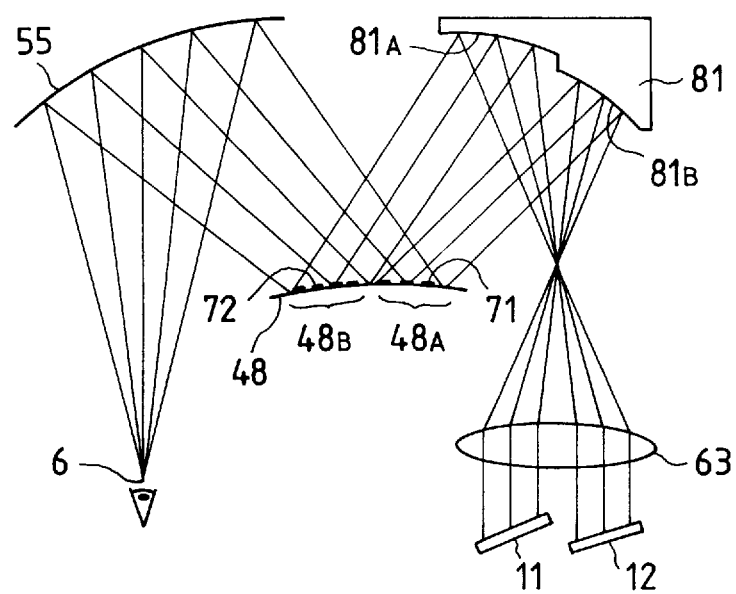
FIG. 27 is a schematic drawing of the major part of Embodiment 17 of the present invention.
Figure 28:
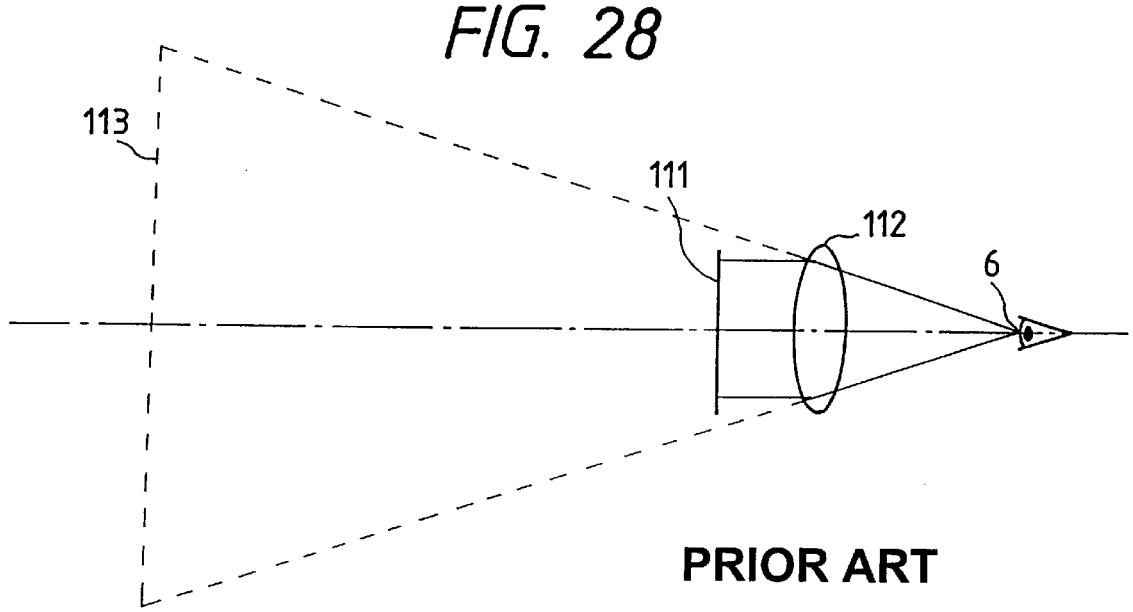
FIG. 28 is a schematic drawing of the major part of the optical system in a conventional image displaying apparatus.
Figure 29:
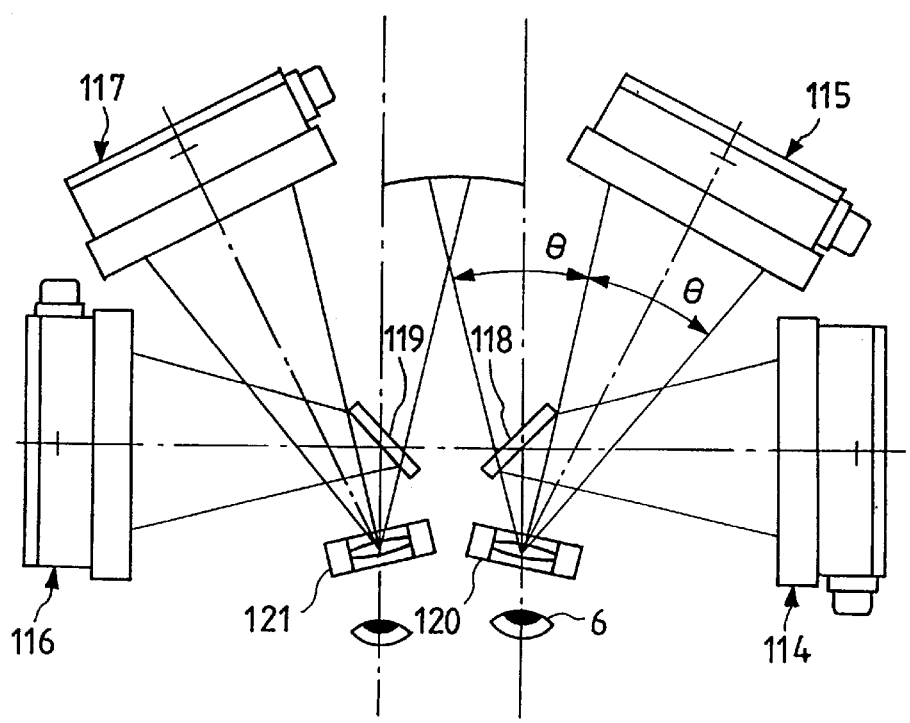
FIG. 29 is a schematic drawing of the major part of another conventional image displaying apparatus.

FIG. 27 is a schematic drawing to show the major part of Embodiment 17 of the present invention. The present embodiment has such a setup that the setup of Embodiment 15 is modified to form the intermediate images on a curved surface by the relay optical system and the composite curved reflecting surface 46 is replaced by a diffusion reflecting surface (synthesizer reflecting surface) 48 of a curved surface. In the drawing, numeral 48 stands for a spherical diffusion reflecting surface, and intermediate image planes of the first optical system consisting of the lens 63 and the curved reflecting surface $81_A$ and the second optical system consisting of the lens 63 and the curved reflecting surface $81_B$ are focused and combined as adjacent to the intermediate images 71, 72 on the diffusion reflecting surface 48.

For that purpose, each of the image displaying means 11, 12 and lens 63 is arranged to form a decentering optical system in each optical system so that each display image may form an image plane on the diffusion reflecting surface 48.

Further, the eyepiece optical system 55 is positioned as inclined relative to the axis O (the axis connecting the center of the observer's pupil with the center of the virtual image) so as to form a virtual image at a predetermined distance ahead of the observer from the intermediate image on the diffusion reflecting surface 48.

Employing the above setup suitable for wide angles, the diffusion reflecting surface 48 is preferably arranged further to have diffusion characteristics separately set in the region $48_A$ and region $48_B$. Namely, an image displaying apparatus with good efficiency can be obtained when the diffusion reflecting surface 48 has continuously changing diffusion characteristics to give a peak of a reflected light quantity in a direction in which principal rays of a beam at each field angle from the reflecting surfaces $81_A$, $81_B$ are incident to the curved reflecting surface 55.

Seventeen embodiments were described above, and it is noted that some technology disclosed in a certain embodiment may be applied to another embodiment.

For example, the arrangement of the synthesizer reflecting surfaces being the paraboloid-of-revolution reflecting surfaces as disclosed in Embodiment 7 may be applied to Embodiments 9, 12, 13, and so on in which the observing optical system is composed of the relay optical system and the eyepiece (eyepiece optical system).

Further, the arrangement in which the eyepiece is formed as an anamorphic optical system as disclosed in Embodiments 2 and 3 may be applied to Embodiments 9, 10, 13, 14, 16, etc.

Further, the technique of using the image displaying means having the display surfaces of different sizes as disclosed in Embodiments 6, 9 or the technique of defining a part of the display surface as an effective image display region and displaying the display image only in this region may be applied to almost all other embodiments.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image displaying apparatus comprising:

a plurality of image displaying means for displaying respective display images on display surfaces thereof;

a relay optical system for forming intermediate images of the respective display images, said relay optical system having optical systems provided in correspondence to said respective image displaying means, said optical systems having respective curved reflecting surfaces positioned so that adjacent-side principal rays of adjacent display images of said plurality of display images travel in a same optical path after being reflected by said plurality of reflecting surfaces; and a common optical system for guiding light beams from said plurality of reflecting surfaces to a pupil of an observer.

2. The apparatus according to claim 1, wherein said optical system has an anamorphic optical system.

3. The apparatus according to claim 1, wherein each of said plurality of reflecting surfaces is of a paraboloid of revolution and wherein the reflecting surfaces are positioned so that focus positions of the respective reflecting surfaces are coincident with each other.

4. The apparatus according to claim 1, wherein an optical pathlength from said display surface to said reflecting surface corresponding thereto, of a principal ray emerging from the center of the display surface of said image displaying means differs depending upon each image displaying means.

5. The apparatus according to claim 1, wherein at least two reflecting surfaces out of said plurality of reflecting surfaces are formed in an integral member.

6. The apparatus according to claim 1, wherein said image displaying means are reflection type display panels having reflecting surfaces in pixel units.

7. An image displaying apparatus comprising:

a plurality of image displaying means for displaying respective display images on display surfaces thereof;

a relay optical system for forming intermediate images of the respective display images so as to be adjacent to each other, said relay optical system having optical systems provided in correspondance to said respective image displaying means;

reflecting surfaces provided in correspondence to the respective intermediate images, for reflecting the intermediate images so that adjacent-side principal rays of adjacent intermediate images of said intermediate images travel in the same optical path; and an observing optical system for guiding light beams from said reflecting surfaces to a pupil of an observer, thereby letting the observer observe an enlarged virtual image of said intermediate images.

8. The apparatus according to claim 7, wherein said reflecting surfaces each are formed of respective curved surfaces.

9. The apparatus according to claim 7, wherein said observing optical system has an anamorphic optical system.

10. The apparatus according to claim 7, wherein said reflecting surfaces are formed in an integral member in an adjacent fashion.

11. The apparatus according to claim 7, wherein said reflecting surfaces have a diffusing action.

12. The apparatus according to claim 7, wherein said image displaying means are reflection type display panels having reflecting surfaces in pixel units.

* * * * *

UNITED STATES PATENT AND TRADEMARK OFFICE
CERTIFICATE OF CORRECTION

PATENT NO. : 5,844,713
DATED : December 1, 1998
INVENTOR(S) : Norihiro Nanba et al.

It is certified that error appears in the above-identified patent and that said Letters Patent is hereby corrected as shown below:

Column 10, line 5, please delete "4E" and insert therefor -- $4_E$ --.

Column 13, Table 3, Line 27, please delete "e min" and insert therefor -- e mm --

Column 22, line 57, please delete "46A" and insert therefor -- $46_A$ --.

Signed and Sealed this

Eleventh Day of May, 1999

Q. TODD DICKINSON

*Attest:*

*Attesting Officer*    Acting Commissioner of Patents and Trademarks